United States Patent
Paz et al.

(10) Patent No.: US 11,824,693 B2
(45) Date of Patent: Nov. 21, 2023

(54) CHANNEL STATE FEEDBACK EXTENSIONS FOR MULTI-LEVEL CODING

(71) Applicant: QUALCOMM Incorporated, San Diego, CA (US)

(72) Inventors: Daniel Paz, Tirat Carmel (IL); Michael Levitsky, Rehovot (IL); Assaf Touboul, Netanya (IL); Shay Landis, Hod Hasharon (IL); Amit Bar-Or Tillinger, Tel-Aviv (IL); Ronen Shaked, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 17/169,280

(22) Filed: Feb. 5, 2021

(65) Prior Publication Data

US 2022/0255778 A1 Aug. 11, 2022

(51) Int. Cl.
*H04L 25/49* (2006.01)
*H04B 7/06* (2006.01)
*H04W 72/23* (2023.01)

(52) U.S. Cl.
CPC ....... *H04L 25/4917* (2013.01); *H04B 7/0626* (2013.01); *H04B 7/0632* (2013.01); *H04W 72/23* (2023.01)

(58) Field of Classification Search
CPC ............. H04L 25/4917; H04W 72/042; H04B 7/0626; H04B 7/0632
See application file for complete search history.

(56) References Cited

U.S. PATENT DOCUMENTS

| | | | | |
|---|---|---|---|---|
| 2003/0235149 | A1* | 12/2003 | Chan | H04L 27/38 370/206 |
| 2005/0149843 | A1* | 7/2005 | Shen | H04L 27/183 714/800 |
| 2008/0219219 | A1* | 9/2008 | Sartori | H04L 5/006 370/335 |
| 2009/0180455 | A1* | 7/2009 | Ranganathan | H04L 25/03044 370/342 |
| 2017/0126354 | A1* | 5/2017 | Marsland | H04L 1/203 |
| 2019/0200348 | A1* | 6/2019 | Chae | H04L 5/0085 |
| 2021/0329444 | A1* | 10/2021 | Wiemann | H04W 8/24 |

FOREIGN PATENT DOCUMENTS

WO WO-2014148962 A1 * 9/2014 ........... H04L 1/0003

* cited by examiner

*Primary Examiner* — Brenda H Pham
(74) *Attorney, Agent, or Firm* — Holland & Hart LLP

(57) ABSTRACT

Methods, systems, and devices for wireless communications are described. A base station may transmit signaling that configures a wireless device to use a multi-level coding (MLC) procedure to communicate with a base station. Based on receiving the signaling, the wireless device may select a channel quality indicator (CQI) index from a set of CQI indices that are associated with an MLC procedure. In some examples, the wireless device selects the CQI index from a set of CQI indices that includes both bit-interleaved coded modulation (BICM)-based and MLC-based CQI indices. In other examples, the wireless device selects the CQI index from a set of CQI indices that includes solely MLC-based CQI indices. The wireless device may transmit the selected CQI index to the base station. And the base station may select a modulation and coding scheme for subsequent transmissions to the wireless device based on the received CQI index.

26 Claims, 14 Drawing Sheets

CHANNEL STATE FEEDBACK EXTENSIONS FOR MULTI-LEVEL CODING

FIELD OF TECHNOLOGY

The present disclosure relates to wireless communications, including channel state feedback extensions for multi-level coding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE reports information about a channel to a base station. A base station may use information reported by a UE about a channel to select parameters for transmitting to the UE. In some examples, the UE requests that the base station use a set of transmission parameters by transmitting an indicator to the base station that is associated with the set of transmission parameters.

SUMMARY

The described techniques relate to improved methods, systems, devices, and apparatuses that support channel state feedback extensions for multi-level coding. A base station may transmit signaling that configures a wireless device (e.g., a UE) to use a multi-level coding (MLC) procedure to communicate with a base station. Based on receiving the signaling, the wireless device may select a channel quality indicator (CQI) index from a set of CQI indices that are associated with an MLC procedure. In some examples, the wireless device selects the CQI index from a set of CQI indices that includes both bit-interleaved coded modulation (BICM)-based and MLC-based CQI indices. In other examples, the wireless device selects the CQI index from a set of CQI indices that includes solely MLC-based CQI indices. The wireless device may transmit the selected CQI index to the base station. And the base station may select a modulation and coding scheme (e.g., a modulation order, a code rate, or a combination of these) for subsequent transmissions to the wireless device based on the received CQI index.

A method for wireless communication at a user equipment (UE) is described. The method may include receiving, from a base station, a message indicating a configuration for the UE to use a multi-level coding procedure to communicate with the base station, selecting, for a channel quality indicator, a channel quality index from a set of multiple channel quality indices based on the multi-level coding procedure being configured, the set of multiple channel quality indices including a set of channel quality indices associated with the multi-level coding procedure, and transmitting, to the base station, a channel state feedback report including the selected channel quality index.

An apparatus for wireless communication at a UE is described. The apparatus may include a processor, memory in electronic communication with the processor, and instructions stored in the memory. The instructions may be executable by the processor to cause the apparatus to receive, from a base station, a message indicating a configuration for the UE to use a multi-level coding procedure to communicate with the base station, select, for a channel quality indicator, a channel quality index from a set of multiple channel quality indices based on the multi-level coding procedure being configured, the set of multiple channel quality indices including a set of channel quality indices associated with the multi-level coding procedure, and transmit, to the base station, a channel state feedback report including the selected channel quality index.

Another apparatus for wireless communication at a UE is described. The apparatus may include means for receiving, from a base station, a message indicating a configuration for the UE to use a multi-level coding procedure to communicate with the base station, means for selecting, for a channel quality indicator, a channel quality index from a set of multiple channel quality indices based on the multi-level coding procedure being configured, the set of multiple channel quality indices including a set of channel quality indices associated with the multi-level coding procedure, and means for transmitting, to the base station, a channel state feedback report including the selected channel quality index.

A non-transitory computer-readable medium storing code for wireless communication at a UE is described. The code may include instructions executable by a processor to receive, from a base station, a message indicating a configuration for the UE to use a multi-level coding procedure to communicate with the base station, select, for a channel quality indicator, a channel quality index from a set of multiple channel quality indices based on the multi-level coding procedure being configured, the set of multiple channel quality indices including a set of channel quality indices associated with the multi-level coding procedure, and transmit, to the base station, a channel state feedback report including the selected channel quality index.

In some examples of the method, apparatuses, and non-transitory computer-readable medium described herein, selecting the channel quality index may include operations, features, means, or instructions for selecting the set of multiple channel quality indices based on the multi-level coding procedure being configured, where a second set of multiple channel quality indices includes a second set of channel quality indices associated with a bit-interleaved coded modulation procedure.

Some examples of the method, apparatuses, and non-transitory computer-readable medium described herein may further include operations, features, means, or instructions for receiving, from the base station before or after identifying the set of multiple channel quality indices, a second message indicating a second configuration for the UE to use the bit-interleaved coded modulation procedure to communicate with the base station, identifying the second set of multiple channel quality indices based on the second configuration for the UE to use the bit-interleaved coded modulation procedure, and selecting, for a second channel quality indicator, a second channel quality index from the second set of multiple channel quality indices based on the UE being configured to use the bit-interleaved coded modulation procedure.

Some examples of the method, apparatuses, and non-transitory computer-readable medium described herein may further include operations, features, means, or instructions for determining a signal-to-noise ratio for a channel between the UE and the base station and transmitting an indication of the signal-to-noise ratio to the base station, where the message indicating the configuration for the UE to use the multi-level coding procedure may be received at least in part in response to the transmitted indication.

Some examples of the method, apparatuses, and non-transitory computer-readable medium described herein may further include operations, features, means, or instructions for determining a signal-to-noise ratio for a channel between the UE and the base station and transmitting a request to use the set of multiple channel quality indices associated with the multi-level coding procedure based on the signal-to-noise ratio exceeding a threshold, where the message indicating a configuration for the UE to use the multi-level coding procedure may be received at least in part in response to the request.

Some examples of the method, apparatuses, and non-transitory computer-readable medium described herein may further include operations, features, means, or instructions for transmitting an indication of a multi-level coding capability to the base station, where the message indicating a configuration for the UE to use the multi-level coding procedure may be received based on transmitting the indication of the multi-level coding capability.

In some examples of the method, apparatuses, and non-transitory computer-readable medium described herein, the message indicating a configuration for the UE to use the multi-level coding procedure may be a radio resource control message, a downlink control information message, or a medium access control message.

In some examples of the method, apparatuses, and non-transitory computer-readable medium described herein, selecting the channel quality index may include operations, features, means, or instructions for selecting the channel quality index from the set of multiple channel quality indices that further includes a second set of channel quality indices associated with a bit-interleaved coded modulation procedure.

Some examples of the method, apparatuses, and non-transitory computer-readable medium described herein may further include operations, features, means, or instructions for determining a spectral efficiency metric and a channel type for a channel between the UE and the base station, where the channel quality index may be selected based on the spectral efficiency metric and the channel type.

Some examples of the method, apparatuses, and non-transitory computer-readable medium described herein may further include operations, features, means, or instructions for receiving a reference signal from the base station via the channel, where the spectral efficiency metric and the channel type may be determined based on the reference signal.

Some examples of the method, apparatuses, and non-transitory computer-readable medium described herein may further include operations, features, means, or instructions for selecting a multi-stage decoding procedure for the channel based on the spectral efficiency metric having a first value and the channel type being of an average Gaussian white noise channel type, where the channel quality index may be selected based on the multi-stage decoding procedure being selected for the channel.

In some examples of the method, apparatuses, and non-transitory computer-readable medium described herein, selecting, before or after selecting the multi-stage decoding procedure, a parallel independent decoding procedure for the channel based on the spectral efficiency metric having the first value and the channel type being of a fading type and selecting, for a second channel quality indicator, a second channel quality index of the set of multiple channel quality indices based on the parallel independent decoding procedure being selected for the channel.

A method for wireless communication at a base station is described. The method may include transmitting, to a UE, a message indicating a configuration for the UE to use a multi-level coding procedure to communicate with the base station, receiving, from the UE, a channel state feedback report including a channel quality index based on configuring the multi-level coding procedure, and selecting the multi-level coding procedure for transmitting to the UE based on the channel quality index.

An apparatus for wireless communication at a base station is described. The apparatus may include a processor, memory in electronic communication with the processor, and instructions stored in the memory. The instructions may be executable by the processor to cause the apparatus to transmit, to a UE, a message indicating a configuration for the UE to use a multi-level coding procedure to communicate with the base station, receive, from the UE, a channel state feedback report including a channel quality index based on configuring the multi-level coding procedure, and select the multi-level coding procedure for transmitting to the UE based on the channel quality index.

Another apparatus for wireless communication at a base station is described. The apparatus may include means for transmitting, to a UE, a message indicating a configuration for the UE to use a multi-level coding procedure to communicate with the base station, means for receiving, from the UE, a channel state feedback report including a channel quality index based on configuring the multi-level coding procedure, and means for selecting the multi-level coding procedure for transmitting to the UE based on the channel quality index.

A non-transitory computer-readable medium storing code for wireless communication at a base station is described. The code may include instructions executable by a processor to transmit, to a UE, a message indicating a configuration for the UE to use a multi-level coding procedure to communicate with the base station, receive, from the UE, a channel state feedback report including a channel quality index based on configuring the multi-level coding procedure, and select the multi-level coding procedure for transmitting to the UE based on the channel quality index.

Some examples of the method, apparatuses, and non-transitory computer-readable medium described herein may further include operations, features, means, or instructions for receiving, from the UE, an indication of a signal-to-noise ratio associated with a channel between the base station and the UE, where the message indicating a configuration for the UE to use the multi-level coding procedure may be transmitted to the UE based on the signal-to-noise ratio exceeding a threshold.

In some examples of the method, apparatuses, and non-transitory computer-readable medium described herein, the message indicating a configuration for the UE to use the multi-level coding procedure includes an indication to use a first set of multiple channel quality indices associated with the multi-level coding procedure, and a second set of multiple channel quality indices may be associated with a bit-interleaved coded modulation procedure.

In some examples of the method, apparatuses, and non-transitory computer-readable medium described herein, the message indicating a configuration for the UE to use the multi-level coding procedure may be a radio resource control message, a downlink control information message, or a medium access control message.

DETAILED DESCRIPTION

Figure 1:
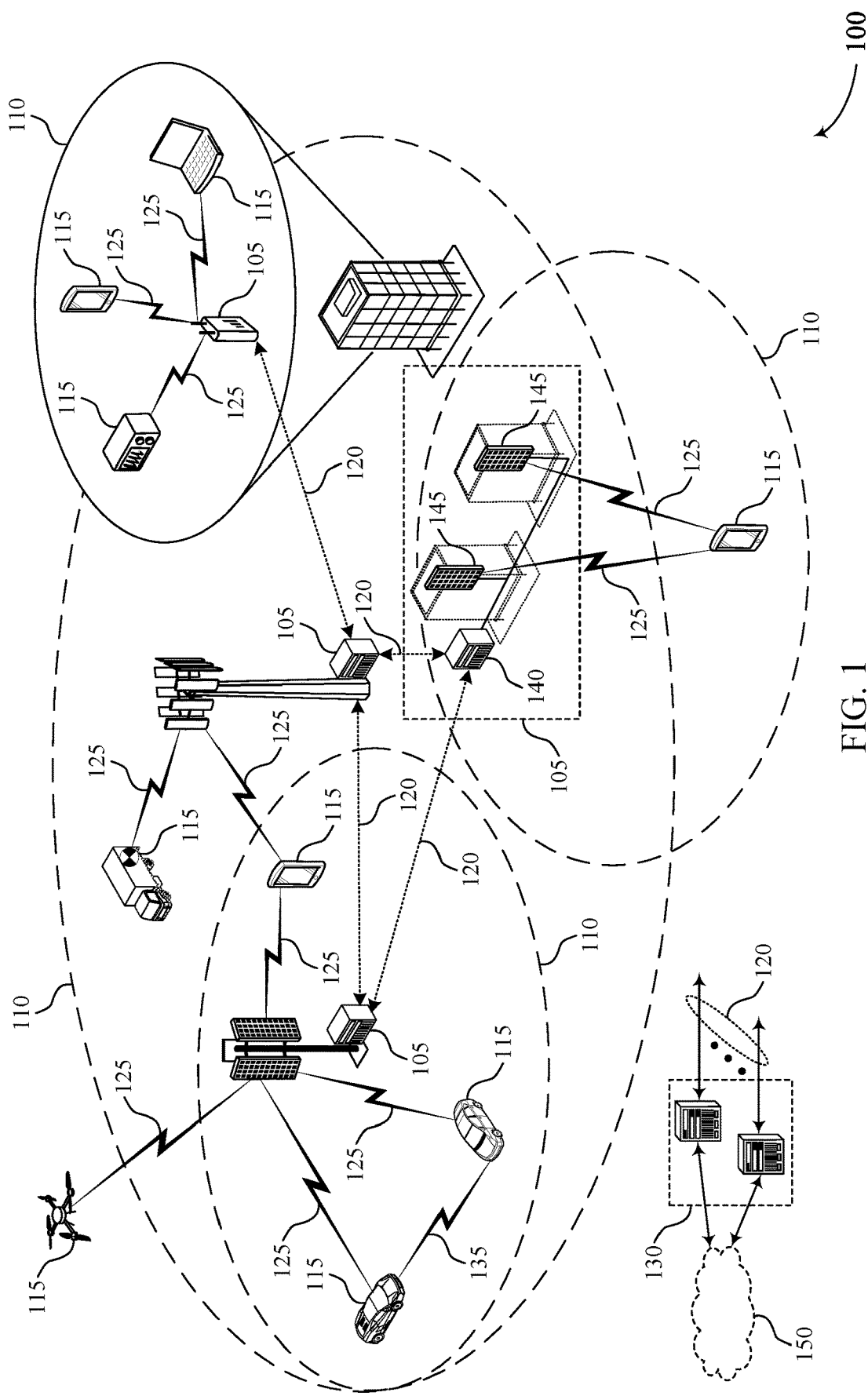
FIG. 1 illustrates an example of a wireless communications system that supports channel state feedback extensions for multi-level coding in accordance with aspects of the present disclosure.

A modulation and coding procedure may be selected from a set of available modulation and coding procedures and used to generate, from a set of information bits, one or more data symbols for a transmission. The available coding procedures (e.g., a bit-interleaved coded modulation (BICM) procedure) associated with the set of available modulation and coding procedures may provide an equal level of error-protection to each binary bit that represents a data symbol generated in accordance with a symbol constellation. However, some bits associated with the binary representation of the data symbol (also referenceable as labeling bits) may be more susceptible to errors than other bits associated with the binary representation of the data symbol. Thus, the ability to apply varying levels of error-protection to different bits of the binary representation of a data symbol may be beneficial for a wireless communications system. A multi-level coding (MLC) procedure may provide varying levels of error-protection to different bits of the binary representation of a data symbol. However, mechanisms for supporting communications using MLC procedures may not be established for a wireless communications system.

To support the use of MLC procedures, mechanisms (e.g., new signaling, updated signaling, signaling exchanges, etc.) that support the use of MLC procedures may be established. In some examples, a set of channel quality indicator (CQI) indices that may be selected for a CQI and that are associated with MLC-based modulation and coding schemes may be established. In some examples, the set of CQI indices may be included in a larger set of CQI indices that also includes a set of CQI indices associated with BICM-based modulation and coding schemes. In other examples, the set of CQI indices may be separate from a second set of CQI indices associated with BICM-based modulation and coding schemes—thus, the values of the set of CQI indices may overlap with the values of the second set of CQI indices. By separating the set of CQI indices from the second set of CQI indices, a quantity of bits used to represent the different sets of CQI indices may be reduced relative to including both sets of CQI indices in a larger set of CQI indices.

In some examples, a base station may transmit signaling that configures a wireless device to use an MLC procedure to communicate with a base station. Based on receiving the signaling, the wireless device may select a CQI index from a set of CQI indices that are associated with an MLC procedure. In some examples, the wireless device selects the CQI index from a set of CQI indices that includes both BICM-based and MLC-based CQI indices. In other examples, the wireless device selects the CQI index from a set of CQI indices that includes solely MLC-based CQI indices—e.g., based on being configured to use the MLC procedure or based on signaling received from the base station. The wireless device may transmit the selected CQI index to the base station. And the base station may select a modulation and coding scheme (e.g., a modulation order, a code rate, or a combination of these) for subsequent transmissions to the wireless device based on the received CQI index.

Aspects of the disclosure are initially described in the context of wireless communications systems. Aspects of the disclosure are also described in the context of process flows. Aspects of the disclosure are further illustrated by and described with reference to apparatus diagrams, system diagrams, and flowcharts that relate to channel state feedback extensions for multi-level coding.

FIG. 1 illustrates an example of a wireless communications system 100 that supports channel state feedback extensions for multi-level coding in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into several slots. Alternatively, each frame may include a variable number of slots, and the number of slots may depend on subcarrier spacing. Each slot may include several symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by several symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to several control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE- Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be in diverse geographic locations. A base station 105 may have an antenna array with several rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Communications between wireless devices may be performed over wireless channels. A channel between a transmitting device and a receiving device may have timing, frequency, and propagation characteristics that determine how a signal is affected during transmission. In some examples, different channel types are associated with different channel characteristics. For example, an additive white Gaussian noise channel may be associated with a first set of channel characteristics and a fading channel may be associated with a second set of channel characteristics.

A wireless communications system 100 may support procedures for estimating characteristics of a channel. In some examples, reference signals are communicated between wireless devices and used to determine characteristics (e.g., timing, frequency, or attenuation characteristics) of a channel between the wireless devices. Reference signals may include channel state information (CSI) reference signals (RS) (CSI-RS), demodulation reference signals (DMRS), sounding reference signals (SRS), tracking reference signal (TRS), phase tracking reference signals (PTRS), and the like. A wireless device (e.g., UE) may receive, from another wireless device (e.g., a base station), a reference signal and use the received version of the reference signal and the transmitted version of the reference signal (which may be known to the wireless device) to determine characteristics (e.g., signal quality, Doppler frequency, a power delay profile, delay spread, and the like) of the channel over which the reference signal was transmitted. The wireless device may use the estimated channel to determine transmission parameters that are well-suited for the channel (e.g., a preferred precoding matrix and rank). The wireless device may use the estimated channel to determine additional transmission parameters (e.g., a preferred modulation and coding scheme)—e.g., based on the other transmission parameters. In some examples, the wireless device uses the estimated channel and, in some examples, one or more determined transmission parameters to determine a spectral efficiency that is obtainable for the channel—spectral efficiency may be a measure of the throughput that can be conveyed by a link using allocated resources. In some examples, the preferred modulation and coding scheme may be determined based on the determined spectral efficiency.

After determining preferred transmission parameters for the estimated channel, the wireless device may transmit an indication of the preferred transmission parameters to the other wireless device. In some examples, the wireless device may generate a report including the indication of the preferred transmission parameters, which may be referred to as a channel state feedback (CSF) report. The CSF report may include a CQI, a precoding matrix indicator (PMI), a rank indicator (RI), a beam indicator (CRI), and the like. A value of the CQI may be based on the spectral efficiency obtainable for the channel. In some examples, the value of the CQI is selected using a table that maps CQI indices to spectral efficiency values and modulation and coding schemes. For example, for a first calculated spectral efficiency, the wireless device may indicate a first CQI index, for a second calculated spectral efficiency, the wireless device may indicate a second CQI index, and so on. Each index of the CQI may be associated with a modulation and coding scheme. For example, a first index may be associated with a first modulation (e.g., 16-quadrature amplitude modulation (QAM)) and a first coding rate (e.g., a 0.438 coding rate), a second index may be associated with the same or a different modulation (e.g., 16-QAM or 64-QAM) and a second coding rate (e.g., a 0.587 coding rate if the second index is associated with 16-QAM or a 0.369 coding rate if the second index is associated with 64-QAM), and so on.

The other wireless device may receive the indication of the preferred transmission parameters and may use the indicated transmission parameters (or related transmission parameters) for subsequent communications to the wireless device. In some examples, the other wireless device may select a modulation and coding scheme based on the value of the CQI. For example, if the first index is indicated by the CQI, the other wireless device may use the first modulation (e.g., 16-QAM) and the first coding rate (e.g., a 0.438 coding rate) for subsequent transmissions to the wireless device.

A wireless communications system 100 may support a set of modulation and coding procedures for communicating information between wireless devices. Different modulation procedures (e.g., PSK, QAM, etc.) may be used to convert sets of information bits into unique data symbols. Different coding procedures may be used to protect information bits against errors that may occur during transmission of the information bits. In some examples, a wireless communications system 100 supports BICM procedures. During a BICM process, information bits may be interleaved and encoded, the resulting encoded information bits may be grouped in accordance with a configured modulation procedure, and the grouped information bits may be mapped to corresponding points of a symbol constellation (in accordance with the labeling bits of the symbol constellation). BICM may result in equal error protection across all the labeling bits that correspond to a point in a symbol constellation, and thus all the bits in a data symbol may be equally protected from errors that may occur during transmission.

Different bits in a symbol labeling of a symbol constellation may be associated with different error probabilities. Thus, during transmission, different bits in a BICM-based data symbol may have an increased likelihood of error relative to other bits in the BICM-based data symbol. In some examples, the overall performance of wireless communications between wireless devices may increase if the bits that are more susceptible to errors are afforded an increased level of error protection relative to the bits that are less susceptible to errors. Accordingly, a different type of coding procedure that unequally protects the labeling bits and, thus, the bits in a data symbol may be desired.

An MLC procedure may provide different levels of error-protection to be different labeling bits corresponding to different points in a symbol constellation, and thus, to different bits of a transmitted symbol. During an MLC process, the information bits may be grouped in accordance with a configured modulation procedure, the grouped information bits may be separated into subsets of bits associated with different coding levels, and different component codes may be applied to the different subsets of bits in accordance with the different coding levels. In some examples, the labeling bits corresponding to the points of the symbol constellation may be separated into subsets of labeling bits that are associated with different coding levels, where the different component codes may be associated with the different subsets of labeling bits. The summation of the bits in each of the coding levels may be equal to the quantity of bits included in the original symbol labeling. Accordingly, MLC may result in unequal error protection for different bits—e.g., because different subsets of bits may be encoded with different component codes that offer varying levels of protection.

Different methods may be used to decode received MLC-based encoded information. One method for decoding MLC-based encoded information is a multi-stage decoding (MSD) procedure. An MSD procedure may involve decoding a first subset of the received MLC-based encoded information in accordance with a first component code and then decoding a second subset of the received MLC-based encoded information in accordance with a second component code and based on the result of decoding the first subset of the received MLC-based encoded information. That is, the MSD procedure may involve decoding the bits associated with the second level after decoding the bits associated with the first level. Another method for decoding MLC-based encoding information is a parallel independent decoding (PID) procedure. A PID procedure may involve decoding each subset of the received MLC-based encoded information associated with each level independently from each other. That is, the decoding of information bits associated with a first encoding level may not be used while decoding the information bits associated with a second encoding level.

In some examples, the performance of an MLC procedure may be based on the method used to label the points of a symbol constellation, the method used to divide the labeling bits, the methods used to encode the different levels, the quality of the communication channel, or any combination thereof. In some examples, the performance of MLC-based encoded communications may be based on characteristics of the channel over which the MLC-based encoded communication is communicated (e.g., the channel type) and the method used to decode the MLC-based encoded communication. For example, an MSD procedure may increase a performance of MLC-based encoded transmissions that are performed over an additive white Gaussian noise channel (AWGN). And a PID procedure may increase a performance of MLC-based encoded transmissions that are performed over a fading channel.

In some examples, MLC procedures may increase a spectral efficiency of communications relative to BICM-based encoding procedures. Also, when using MLC procedures that include an uncoded lowest level, a power consumption of MLC-based encoded transmissions may be reduced relative to BICM encoded transmissions (e.g., especially for large bandwidths). Thus, to achieve varying levels of error-protection for different bits in a symbol, a wireless communications system 100 may desire to support MLC procedures. In some examples, the wireless communications system 100 may desire to support both BICM and MLC procedures. However, mechanisms for supporting communications using MLC procedures may not be established for a wireless communications system.

To support the use of MLC procedures, mechanisms (e.g., new signaling, updated signaling, signaling exchanges, etc.) that support the use of MLC procedures may be established. In some examples, a set of CQI indices that may be selected for a CQI and that are associated with MLC-based modulation and coding schemes may be established. In some examples, the set of CQI indices may be included in a larger set of CQI indices that also includes a set of CQI indices associated with BICM-based modulation and coding schemes. In other examples, the set of CQI indices may be separate from a second set of CQI indices associated with BICM-based modulation and coding schemes—thus, the values of the set of CQI indices may overlap with the values of the second set of CQI indices. By separating the set of CQI indices from the second set of CQI indices, a quantity of bits used to represent the different sets of CQI indices may be reduced relative to including both sets of CQI indices in a larger set of CQI indices.

In some examples, a base station 105 may transmit signaling that configures a UE 115 to use an MLC procedure to communicate with a base station. Based on receiving the signaling, the UE 115 may select a CQI index from a set of CQI indices that are associated with an MLC procedure. In some examples, the UE 115 selects the CQI index from a set of CQI indices that includes both BICM-based and MLC-based CQI indices. In other examples, the UE 115 selects the CQI index from a set of CQI indices that includes solely MLC-based CQI indices—e.g., based on being configured to use the MLC procedure or based on signaling received from the base station. The UE 115 may transmit the selected CQI index to the base station. And the base station may select a modulation and coding scheme for subsequent transmissions to the UE 115 based on the received CQI index.

Figure 2:
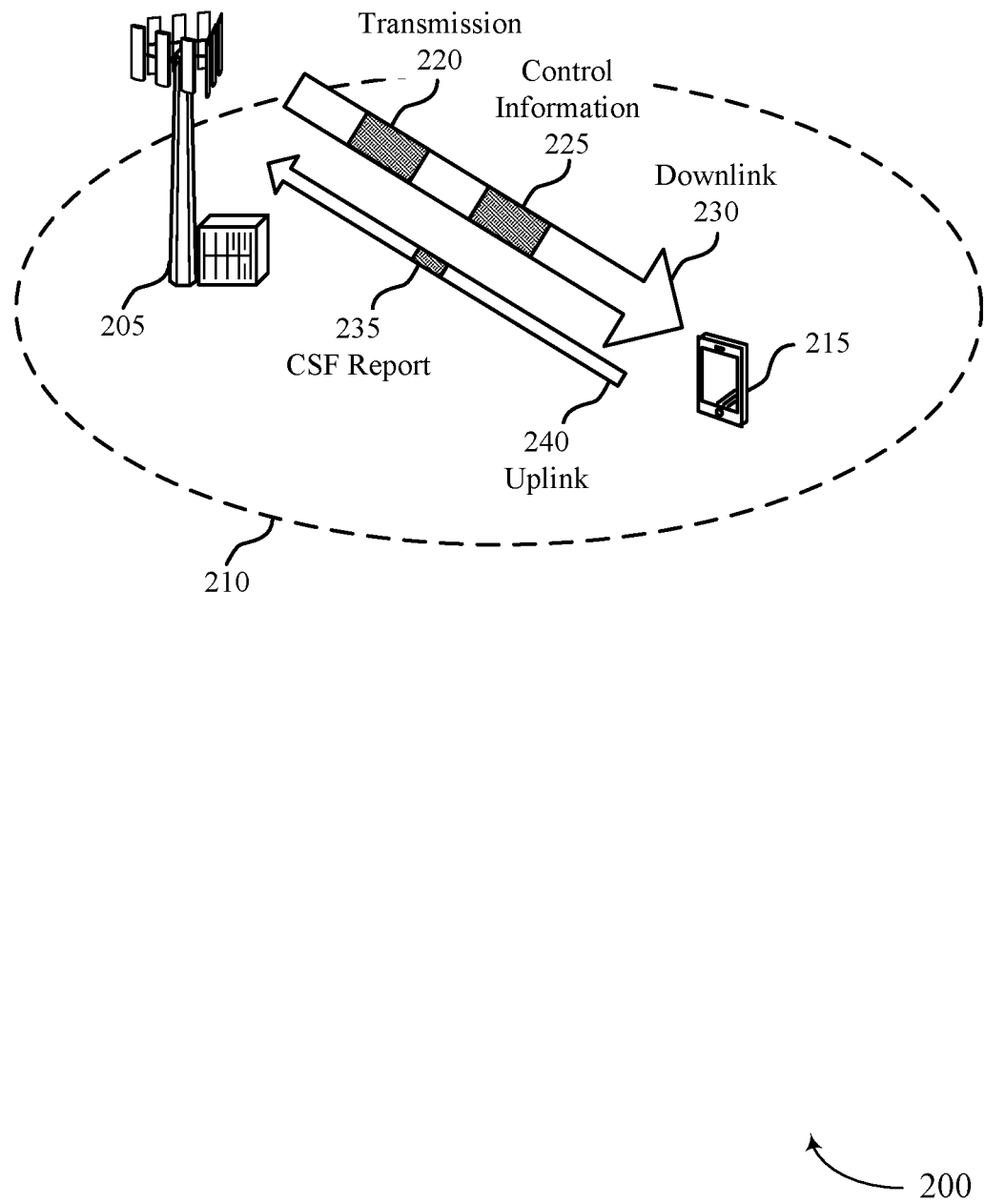
FIG. 2 illustrates an example of a wireless communications subsystem that supports channel state feedback extensions for multi-level coding in accordance with aspects of the present disclosure.

FIG. 2 illustrates an example of a wireless communications subsystem that supports channel state feedback extensions for multi-level coding in accordance with aspects of the present disclosure.

Wireless communications subsystem 200 may include base station 205 and UE 215, which may be examples of a base station and a UE described with reference to FIG. 1. Base station 205 and UE 215 may communication with one another within coverage area 210 via downlink 230 and uplink 240 using one or more of the techniques described in FIG. 1.

In some examples, base station 205 may have information to transmit to UE 215. Base station 205 may encode and modulate the information to obtain data symbols before transmitting the information to UE 215. In some examples, base station 205 may encode the information using a BICM-based encoding procedure. In other examples, base station 205 may encode the information using an MLC-based encoding procedure. In some examples, base station 205 may switch between encoding information using a BICM-based encoding procedure and an MLC-based encoding procedure—e.g., based on changing channel conditions.

Base station 205 may include the data symbols in transmission 220, which may be transmitted to UE 215 via downlink 230. In some examples, base station 205 may also include one or more reference signals (e.g., CSI-RS, DMRS, TRS, PTRS, etc.) in transmission 220. Downlink 230 may be associated with a wireless channel that exists between base station 205 and UE 215. In some examples, base station 205 may also transmit control information (e.g., radio resource control (RRC) information, medium access control (MAC) information, or downlink control information (DCI)) to UE 215. The control information may be used to indicate to UE 215 whether BICM-based encoding or MLC-based encoding is being used by base station 205 for transmissions, such as transmission 220.

UE 215 may receive control information 225 and transmission 220 from base station 205. In some examples, UE 215 determines that an MLC-based encoding procedure is being used for transmission 220. UE 215 may also determine characteristics of the channel between UE 215 and base station 205 based on reference signals included in transmission 220. UE 215 may use the determined characteristics of the channel to determine preferred transmission parameters for the channel, including a preferred precoding matrix, a preferred rank, and a preferred modulation and coding scheme.

In some examples, the determination of the preferred modulation and coding scheme is based on an encoding procedure configured at base station 205. For example, if an MLC-based encoding procedure is configured at base station 205, UE 215 may consult an extended CQI table that includes CQI indices corresponding to both BICM-based and MLC-based encoding procedures modulation and coding schemes. In another example, if an MLC-based encoding procedure is configured at base station 205, UE 215 may consult a CQI table that includes CQI indices correspond to solely MLC-based modulation and encoding schemes (where a different CQI table may correspond to solely BICM-based modulation and encoding schemes)—e.g., based on an indication received from base station 205. In another example, if a BICM-based encoding procedure is configured at base station 205, UE 215 may consult the extended CQI table. Or UE 215 may consult the CQI table that corresponds solely to BICM-based modulation and encoding schemes.

When an MLC-based encoding procedure is used by base station 205, the CQI index selected by UE 215 may be based on a spectral efficiency obtainable for the channel and a classification of the channel as being of a particular type (e.g., an AWGN channel, TDL_A, tapped delay line (TDL)_A channel, TDL_B channel, a fading channel, etc.). As described herein, a decoding procedure (e.g., an MSD procedure or a PID procedure) used to decode MLC-based encoded transmissions may increase a performance of MLC communications, where the decoding procedure that provides the improvement may be based on the type of channel over which the MLC-based encoded transmissions are transmitted. In some examples, UE 215 may select a CQI index associated with a suboptimal spectral efficiency (rather than another CQI index that is associated with a higher spectral efficiency) based on determining that the CQI index is also associated with a preferred MLC-based decoding procedure for the channel relative to the other CQI index (e.g., an MSD procedure for an AWGN channel).

After determining the preferred transmission parameters, UE 215 may generate CSF report 235, where CSF report 235 may include indications of the preferred transmission parameters (e.g., the precoding matrix indicator, rank indicator, and CQI). UE 215 may then transmit the CSF report 235 to base station 205 via uplink 240.

Base station 205 may receive CSF report 235 from UE 215 via uplink 240. Base station 205 may then determine transmission parameters to use for subsequent transmissions to UE 215 based on CSF report 235. For example, base station 205 may determine a rank and precoding matrix to use for subsequent transmission based on an RI and PMI included in CSF report 235. Base station 205 may also determine a modulation and coding scheme based on a CQI included in CSF report 235.

In some examples, base station 205 determines whether to use BICM-based encoding or MLC-based encoding for subsequent transmissions to UE 215 based on the received CQI index—e.g., if an extended table that includes mappings between CQI indices, BICM-based modulation and coding schemes, and MLC-based modulation and coding schemes is configured. In other examples, base station 205 determines whether to use BICM-based encoding or MLC-based encoding for subsequent transmissions to UE 215 based on whether base station 205 previously configured UE 215 to use a BICM-based table or an MLC-based table. In either case, base station 205 may also determine a modulation and coding rate to use for the chosen encoding scheme based on the CQI index. If an MLC-based encoding procedure is configured, base station 205 may determine a coding rate to use for each level of the MLC-based encoding.

Although described in the context of UE 215 indicating transmission parameters to base station 205 so that base station 205 may adapt transmissions to UE 215, the above description may similarly be used to adapt transmissions from UE 215 to base station 205. In some examples, the channel associated with downlink 230 is the same as (or similar to) the channel associated with uplink 240. In other examples, the channel associated with downlink 230 is different (e.g., significantly different) than the channel associated with uplink 240.

Figure 3:
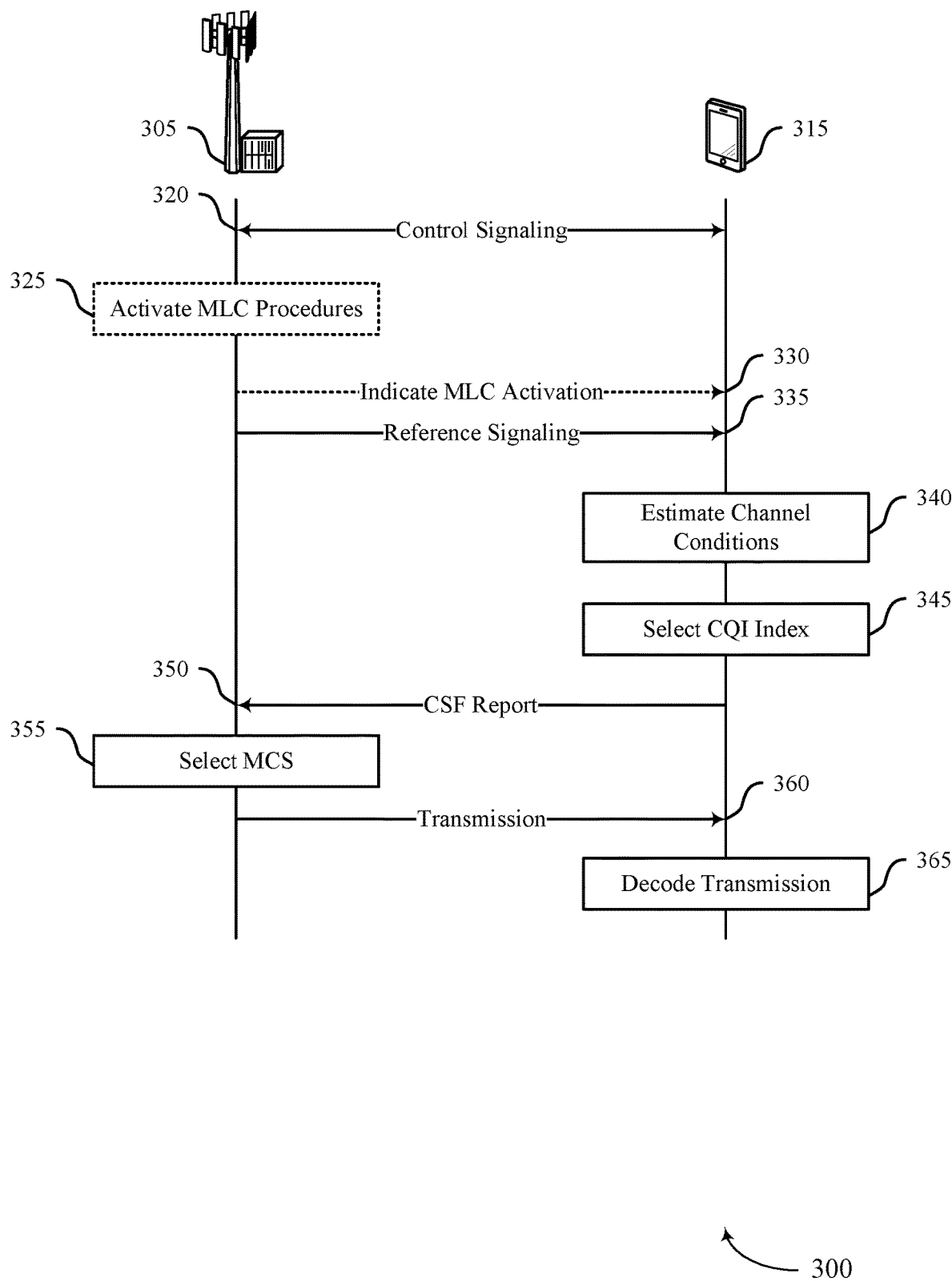
FIG. 3 illustrates an example of a set of operations that supports channel state feedback extensions for multi-level coding in accordance with aspects of the present disclosure.

FIG. 3 illustrates an example of a set of operations that supports channel state feedback extensions for multi-level coding in accordance with aspects of the present disclosure.

Process flow 300 may be performed by base station 305 and UE 315, which may be examples of a base station and a UE described herein. In some examples, process flow 300 illustrates an exemplary sequence of operations performed to support channel state feedback extensions for multi-level coding. For example, process flow 300 depicts operations for selecting a CQI index from an extended CQI table that includes BICM-based and MLC-based CQI indices.

It is understood that one or more of the operations described in process flow 300 may be performed earlier or later in the process, omitted, replaced, supplemented, or combined with another operation. Also, additional operations described herein that are not included in process flow 300 may be included in process flow 300.

At 320, base station 305 and UE 315 may exchange control signaling (e.g., RRC control signaling). In some examples, base station 305 indicates a capability to support MLC procedures to UE 315, and UE 315 indicates a capability to support MLC procedures to base station 305. In some examples, base station 405 may configure a CSF reporting procedure for UE 415—e.g., a periodic CSF reporting procedure or an aperiodically trigged CSF reporting procedure.

In some examples, base station 305 indicates that an extended CQI table is activated. The extended CQI table may correspond to an extended modulation and coding scheme (MCS) table, where a combined extended CQI/MCS table may be represented by Table 1. When MLC procedures are enabled, Table 1 is an example of a table that may be used to indicate the modulation, the overall code rate, the decoding method, a quantity of levels used for the MLC procedure, a quantity of bits included in each level, and a code rate for each level.

At 325, base station 305 may activate MLC procedures for transmissions to UE 315. In some examples, base station 305 may activate the MLC procedures based on channel state information received from UE 315. For example, base station 305 may activate the MLC procedures after determining that signal-to-noise ratio (SNR) values measured at UE 315 exceed a threshold.

At 330, base station 305 may indicate to UE 315 that the MLC procedures have been activated. In some examples, base station 305 indicates that the MLC procedures have been activated by indicating a CQI index associated with an MLC procedure (e.g., one of CQI indices 5 through 8) in a DCI message to UE 315. In some examples, base station 305 indicates that the MLC procedures have been activated (or enabled) by transmitting a DCI message, an RRC message, or a MAC-CE that configures UE 315 to use MLC procedures.

At 335, base station 305 may transmit reference signaling to UE 315. In some examples, base station 305 transmits CSI-RS, DMRS, TRS, PTRS, and the like to UE 315. In some examples, the reference signaling is included in data transmissions to UE 315.

At 340, UE 315 may estimate conditions of a channel between base station 305 and UE 315—e.g., based on the received reference signals. In some examples, UE 315 may estimate a spectral efficiency metric and classify the channel as being associated with a channel type (e.g., an AWGN channel, a fading channel, etc.). In some examples, UE 315 may use CSI-RS to estimate a power delay profile or frequency correlation metric for the channel. In some examples, UE 315 may use TRS to estimate a power delay profile, frequency correlation metric, and channel Doppler parameter for the channel.

At 345, UE 315 may select a CQI index from the extended CQI table based on the estimated channel conditions. In some examples, UE 315 may select a CQI index associated with an MLC procedure based on a spectral efficiency (SPEF) metric and channel type—e.g., after receiving the indication that MLC procedures are activated at base station 305. In some examples, UE 315 may classify the channel as an AWGN channel—thus, UE 315 may determine that an MSD procedure will increase a performance of MLC communications. UE 315 may also estimate an SPEF metric as having a value of 1.20. In some examples, based on classifying the channel as an AWGN channel and estimating an SPEF value of 1.20, UE 315 may select CQI index 5 from Table 1, despite the SPEF value supporting the selection of CQI index 6.

At 350, UE 315 may transmit a CSF report to base station 305 that includes the selected CQI index. The CSF report may also include a PMI, RI, CRI, or any combination thereof.

TABLE 1

| CQI | Mod. | Code Rate | SPEF | Dec. Method | MLC levels | Level 1 C-Rate | Level 2 C-Rate | Level 1 Bits | Level 2 Bits |
|---|---|---|---|---|---|---|---|---|---|
| 1 | 16 QAM | 449/1024 | 0.877 | — | — | — | — | — | — |
| 2 | 16 QAM | 602/1024 | 1.175 | — | — | — | — | — | — |
| 3 | 64 QAM | 378/1024 | 1.476 | — | — | — | — | — | — |
| 4 | 64 QAM | 409/1024 | 1.914 | — | — | — | — | — | — |
| 5 | 16 QAM | 449/1024 | 0.877 | MSD | 2 | 200/1024 | 698/1024 | 2 | 2 |
| 6 | 16 QAM | 602/1024 | 1.175 | PID | 2 | 400/1024 | 804/1024 | 2 | 2 |
| 7 | 64 QAM | 378/1024 | 1.476 | MSD | 2 | 264/1024 | 492/1024 | 3 | 3 |
| 8 | 64 QAM | 409/1024 | 1.914 | PID | 2 | 290/1024 | 528/1024 | 3 | 3 |

At 355, base station 305 may select a modulation and coding scheme (e.g., a modulation order, a code rate, or a combination of these) from the extended MCS table based on the indicated CQI index. For example, if UE 315 indicates a CQI index of 5, then base station 305 may select a modulation and coding scheme that uses 16-QAM modulation, a 0.438 code rate, and two MLC levels associated with two sets of two bits. The code rate for the first level may be a 0.195 code rate, and the code rate for the second level may be a 0.682 code rate. In some examples, base station 305 may select a modulation and coding scheme that corresponds to a CQI index that is different than the CQI index indicated by UE 415—e.g., if the base station 305 classifies the channel differently than UE 315.

At 360, base station 305 may transmit information to UE 315 in accordance with the selected modulation and coding scheme—e.g., using the corresponding modulation, coding rate, and coding procedure. In some examples, base station 305 includes an indication of the selected modulation and coding scheme in DCI included in the transmission.

At 365, UE 315 may decode the transmission in accordance with the modulation and coding scheme used (and, in some examples, indicated) by base station 305. In some examples, base station 305 uses a modulation and coding scheme corresponding to CQI index 5, and UE 315 uses an MSD procedure to decode the transmission. In some examples, base station 305 uses a modulation and coding scheme corresponding to CQI index 6, and UE 315 uses a PID procedure to decode the transmission.

based modulation and coding schemes, where a combined CQI/MCS table that supports BICM procedures may be represented in one example by Table 2. In other examples, base station 405 indicates that a CQI table that supports MLC procedures is activated. The CQI table may correspond to an MCS table that includes MLC-based modulation and coding schemes, where a combined CQI/MCS table that supports MLC procedures may be represented in one example by Table 3. By using different MCS tables, overhead associated with signaling the CQI indices may be maintained (that is, not increased) regardless of whether BICM or MLC procedures are configured.

TABLE 2

| CQI | Mod. | Code Rate | SPEF |
|---|---|---|---|
| 1 | 16 QAM | 449/1024 | 0.877 |
| 2 | 16 QAM | 602/1024 | 1.175 |
| 3 | 64 QAM | 378/1024 | 1.476 |
| 4 | 64 QAM | 409/1024 | 1.914 |

TABLE 3

| CQI | Mod. | Code Rate | SPEF | Dec. Method | MLC levels | Level 1 C-Rate | Level 2 C-Rate | Level 1 Bits | Level 2 Bits |
|---|---|---|---|---|---|---|---|---|---|
| 1 | 16 QAM | 449/1024 | 0.877 | MSD | 2 | 200/1024 | 698/1024 | 2 | 2 |
| 2 | 16 QAM | 602/1024 | 1.175 | PID | 2 | 400/1024 | 804/1024 | 2 | 2 |
| 3 | 64 QAM | 378/1024 | 1.476 | MSD | 2 | 264/1024 | 492/1024 | 3 | 3 |
| 4 | 64 QAM | 409/1024 | 1.914 | PID | 2 | 290/1024 | 528/1024 | 3 | 3 |

In some examples, the extended MCS table may be used by UEs that are relatively static and that consistently experience SNR levels that are above a threshold (e.g., customer premise equipment (CPE) and integrated access and backhaul (IAB) nodes).

Figure 4:
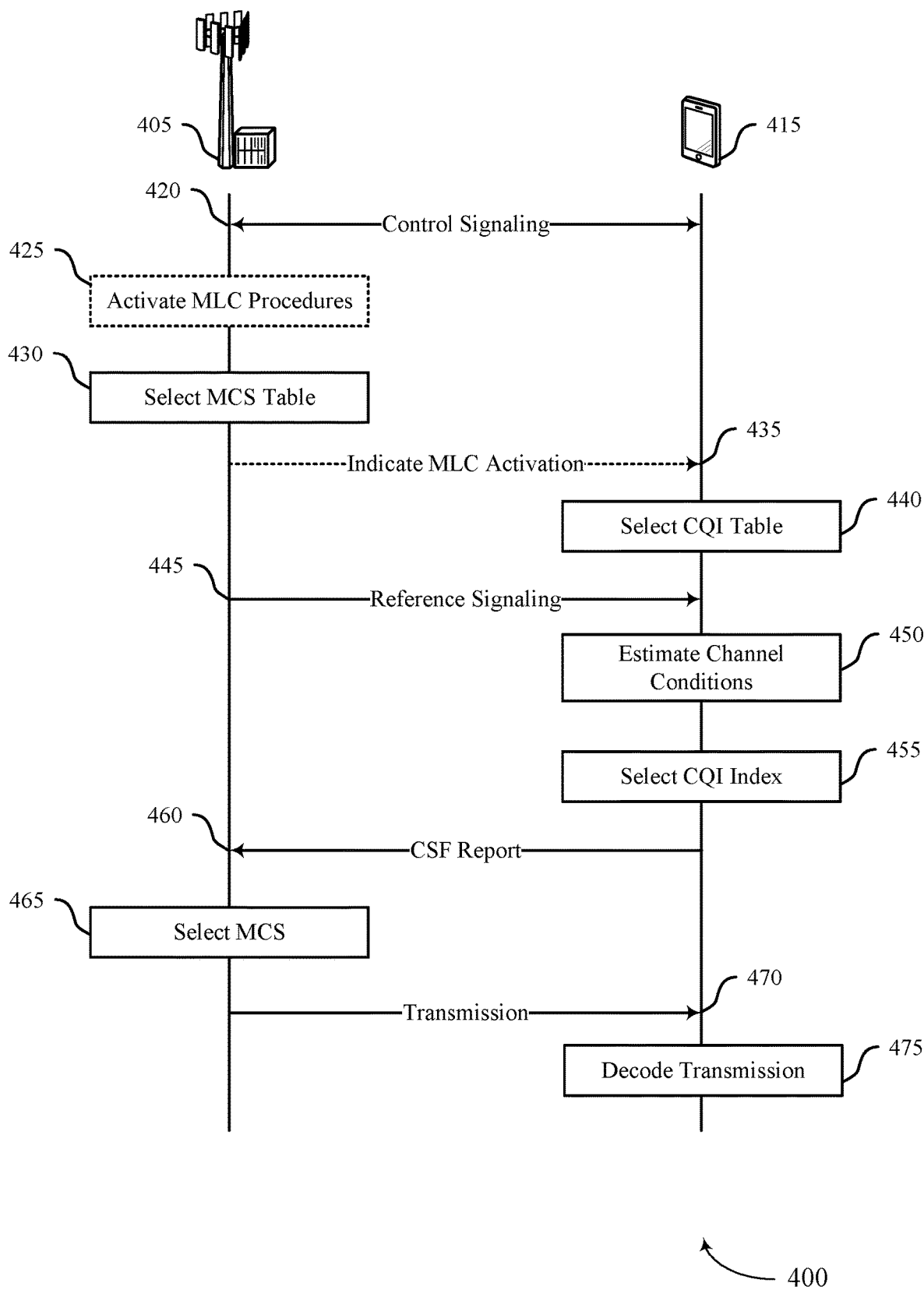
FIG. 4 illustrates an example of a set of operations that supports channel state feedback extensions for multi-level coding in accordance with aspects of the present disclosure.

FIG. 4 illustrates an example of a set of operations that supports channel state feedback extensions for multi-level coding in accordance with aspects of the present disclosure.

Process flow 400 may be performed by base station 405 and UE 415, which may be examples of a base station and a UE described herein. In some examples, process flow 400 illustrates an exemplary sequence of operations performed to support channel state feedback extensions for multi-level coding. For example, process flow 400 depicts operations for selecting a CQI index from a BICM-based CQI table or an MLC-based CQI table.

It is understood that one or more of the operations described in process flow 400 may be performed earlier or later in the process, omitted, replaced, supplemented, or combined with another operation. Also, additional operations described herein that are not included in process flow 400 may be included in process flow 400.

At 420, base station 405 and UE 415 may exchange control signaling (e.g., RRC control signaling). In some examples, base station 405 indicates a capability to support MLC procedures to UE 415, and UE 415 indicates a capability to support MLC procedures to base station 405. In some examples, base station 405 may configure a CSF reporting procedure for UE 415—e.g., a periodic CSF reporting procedure or an aperiodically trigged CSF reporting procedure.

In some examples, base station 405 indicates that a CQI table that supports BICM procedures is activated. The CQI table may correspond to an MCS table that includes BICM- At 425, base station 405 may activate MLC procedures for transmissions to UE 415. In some examples, base station 405 may activate the MLC procedures based on channel state information received from UE 415. For example, base station 405 may activate the MLC procedures after determining that SNR values measured at UE 415 exceed a threshold.

At 430, base station 405 may select an MCS table for transmissions to UE 415. In some examples, base station 405 may select an MCS table that supports MLC procedures—e.g., based on activating the MLC procedures. In some examples, base station 405 may select an MCS table that supports BICM procedures—e.g., if MLC procedures are deactivated. In some examples, base station 405 selects an MLC-based MCS table based on determining that an SNR measured by UE 415 exceeds a threshold. In some examples, base station 405 selects an MLC-based MCS table based on receiving a request from UE 415 to use the MLC-based MCS table—the request may be included in a CSF report. In some examples, UE 415 requests the MLC-based MCS table based on measuring SNR values that exceed a threshold.

At 435, base station 405 may indicate to UE 415 that the MLC procedures have been activated. In some examples, base station 405 may include an indication of the MCS table that is being used by base station 405 for transmissions to UE 415 (e.g., the BICM-based MCS table or the MLC-based MCS table). In some examples, the indication is included in a DCI message that is used to schedule communication resources for UE 415—e.g., when UE 415 is configured for periodic CSF reporting. In some examples, the DCI message may include a field that is used to indicate which MCS table is associated with a transmission scheduled by the DCI message (e.g., a value of "0" may indicate that the BICM-based MCS table is being used and a value of "1" may indicate that the MLC-based MCS table is being used). In some examples, the field may be used to convey multiple bits—e.g., to support more than two MCS tables. By including the indication in the DCI message, base station 405 may dynamically change the MCS table used by base station 405 for transmissions to UE 415.

In some examples, UE 415 is configured to aperiodically report CSF, and a CSI reporting trigger is configured to indicate a CQI table for UE 415 to use for the triggered CSF report. For example, a first trigger state of the CSI trigger may correspond to a BICM-based CQI table, a second trigger state of the CSI trigger may correspond to an MLC-based CQI table, a third trigger state of the CSI trigger may correspond to the BICM-based CQI table (or to a different BICM-based CQI table, the MLC-based CQI table, or a different MLC-based CQI table), and so on. In some examples, the different trigger states may be activated or deactivated by RRC signaling. Also, the different trigger states (and the CQI tables associated with the different trigger states) may be reconfigured by RRC signaling—e.g., so that one or more trigger states may be used to trigger different tables.

In some examples, UE 415 is configured to semi-statically report CSF, and different semi-persistent CSF reports may be activated. In some examples, the semi-persistent CSF report may correspond to different CQI tables. For example, a first semi-persistent CSF report may correspond to a BICM-based CQI table, a second semi-persistent CSF report may correspond to an MLC-based CQI table, a third semi-persistent CSF report may correspond to the BICM-based CQI table (or to a different BICM-based CQI table, the MLC-based CQI table, or a different MLC-based CQI table), and so on. In some examples, MAC-CE or RRC signaling may be used to activate and deactivate different semi-persistent CSF reports. Also, MAC-CE or RRC signaling may be used to reconfigure the CQI tables associated with the different semi-persistent CSF reports. In some examples, the MAC-CE or RRC signaling is configured to change the entries of the CQI table associated with a deactivated semi-persistent CSF report.

At 440, UE 415 may select a CQI table based on the signaling received from base station 405. In some examples, UE 415 selects an MLC-based CQI table based on a DCI message received from base station 405. In some examples, UE 415 selects an MLC-based CQI table based on a trigger state of a CSI trigger received from base station 405 in RRC signaling. In some examples, UE 415 selects an MLC-based CQI table based on which semi-persistent CSF report is enabled by RRC or MAC-CE signaling.

At 445, base station 405 may transmit reference signaling to UE 415. In some examples, base station 405 transmits CSI-RS, DMRS, TRS, PTRS, and the like to UE 415. In some examples, the reference signaling is included in data transmissions to UE 415.

At 450, UE 415 may estimate conditions of a channel between base station 405 and UE 415—e.g., based on the received reference signals. In some examples, UE 415 may estimate a spectral efficiency metric and classify the channel as being associated with a channel type (e.g., an AWGN channel, a TDL_A channel, TDL_B channel, a fading channel, etc.). In some examples, UE 415 may use CSI-RS to estimate a power delay profile or frequency correlation metric for the channel. In some examples, UE 415 may use TRS to estimate a power delay profile, frequency correlation metric, and channel Doppler parameter for the channel. UE 415 may determine the channel type based on a determined power delay profile, frequency correlation metric, Doppler parameter, or any combination thereof.

At 455, UE 415 may select a CQI index from the BICM-based or MLC-based CQI table based on the estimated channel conditions. Based on an MLC-based CQI table being selected by base station 405, UE 415 may select a CQI index based on an SPEF metric and channel type. In some examples, UE 415 may classify the channel as an AWGN channel—thus, UE 415 may determine that an MSD procedure will increase a performance of MLC communications. UE 415 may also estimate an SPEF metric as having a value of 1.20. In some examples, based on classifying the channel as an AWGN channel and estimating an SPEF value of 1.20, UE 415 may select CQI index 1 from the MLC-based MCS table (Table 3), despite the SPEF value supporting the selection of CQI index 2.

At 460, UE 415 may transmit a CSF report to base station 405 that includes the selected CQI index. The CSF report may also include a PMI, RI, CRI, or any combination thereof.

At 465, base station 405 may select a modulation and coding scheme (e.g., a modulation order, a code rate, or a combination of these) from the MLC-based MCS table based on the indicated CQI index. For example, if UE 415 indicates a CQI index of 1, then base station 405 may select a modulation and coding scheme that uses 16-QAM modulation, a 0.438 code rate, and two MLC levels associated with two sets of two bits. The code rate for the first level may be a 0.195 code rate, and the code rate for the second level may be a 0.682 code rate. In some examples, base station 405 may select a modulation and coding scheme that corresponds to a CQI index that is different than the CQI index indicated by UE 415—e.g., if the base station 405 classifies the channel differently than UE 415.

At 470, base station 405 may transmit information to UE 415 in accordance with the selected modulation and coding scheme—e.g., using the corresponding modulation, coding rate, and coding procedure. In some examples, base station 405 includes an indication of the selected modulation and coding scheme in a DCI message included in the transmission.

At 475, UE 415 may decode the transmission in accordance with the modulation and coding scheme used (and, in some examples, indicated) by base station 405. In some examples, base station 405 uses a modulation and coding scheme corresponding to CQI index 1 of the MLC-based MCS table (Table 3), and UE 415 uses an MSD procedure to decode the transmission. In some examples, base station 405 uses a modulation and coding scheme corresponding to CQI index 2 of the MLC-based MCS table (Table 3), and UE 415 uses a PID procedure to decode the transmission.

Figure 5:
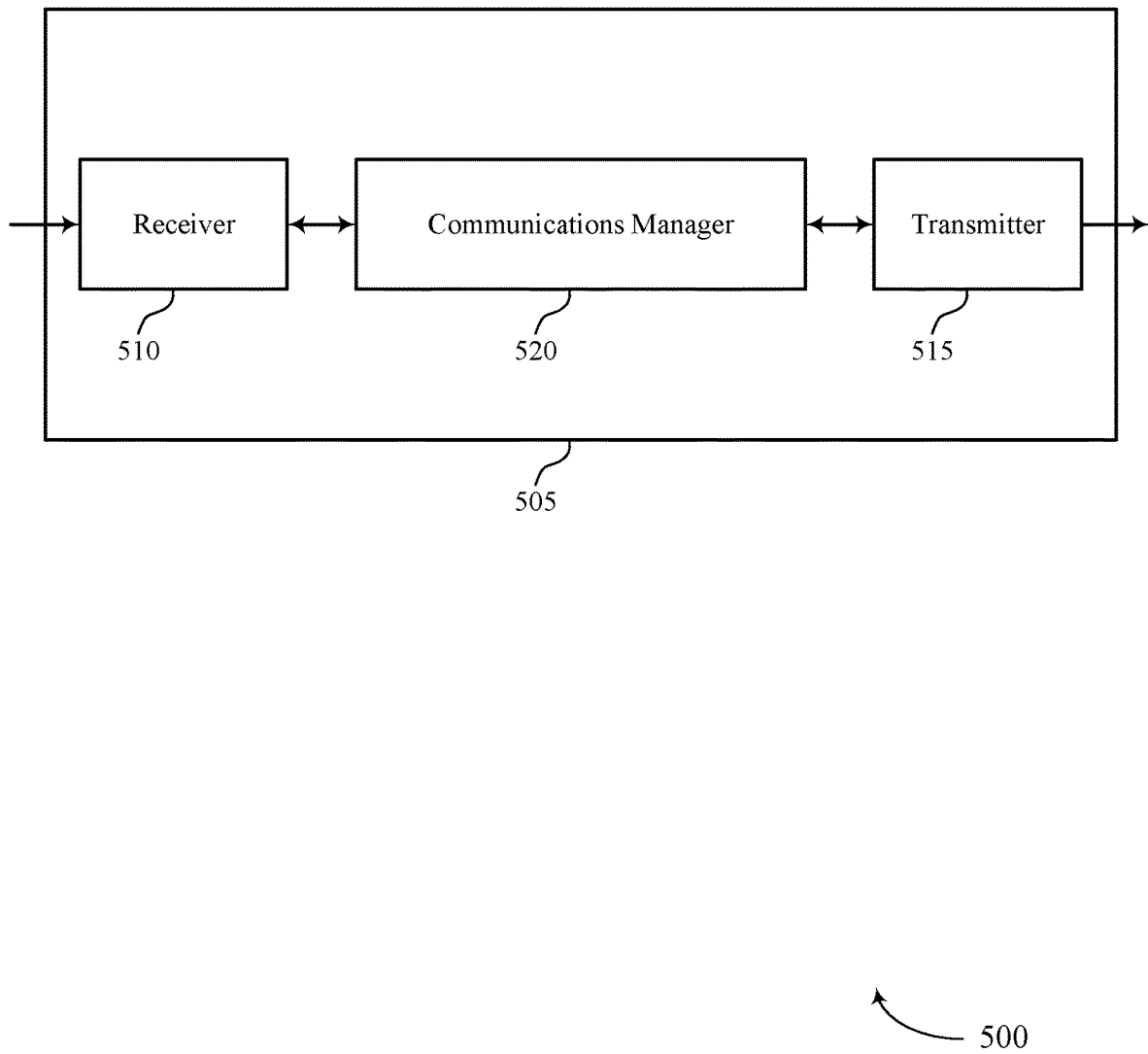
FIGS. 5 and 6 show block diagrams of devices that support channel state feedback extensions for multi-level coding in accordance with aspects of the present disclosure.

FIG. 5 shows a block diagram 500 of a device 505 that supports channel state feedback extensions for multi-level coding in accordance with aspects of the present disclosure. The device 505 may be an example of aspects of a UE 115 as described herein. The device 505 may include a receiver 510, a transmitter 515, and a communications manager 520. The device 505 may also include one or more processors, memory coupled with the one or more processors, and instructions stored in the memory that are executable by the one or more processors to enable the one or more processors to support the multi-level coding features described herein. Each of these components may be in communication with one another (e.g., via one or more buses).

The receiver 510 may provide a means for receiving information such as packets, user data, control information, or any combination thereof associated with various information channels (e.g., control channels, data channels, information channels related to channel state feedback extensions for multi-level coding). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to channel state feedback extensions for multi-level coding). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of channel state feedback extensions for multi-level coding as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, a message indicating a configuration for the UE to use a multi-level coding procedure to communicate with the base station. The communications manager 520 may be configured as or otherwise support a means for selecting, for a channel quality indicator, a channel quality index from a set of multiple channel quality indices based on the multi-level coding procedure being configured, the set of multiple channel quality indices including a set of channel quality indices associated with the multi-level coding procedure. The communications manager 520 may be configured as or otherwise support a means for transmitting, to the base station, a channel state feedback report including the selected channel quality index.

By including or configuring the communications manager 520 in accordance with examples as described herein, the device 505 (e.g., a processor controlling or otherwise coupled to the receiver 510, the transmitter 515, the communications manager 520, or a combination thereof) may support techniques (such as channel state reporting techniques) for supporting the use of MLC procedures in a radio access network.

Figure 6:
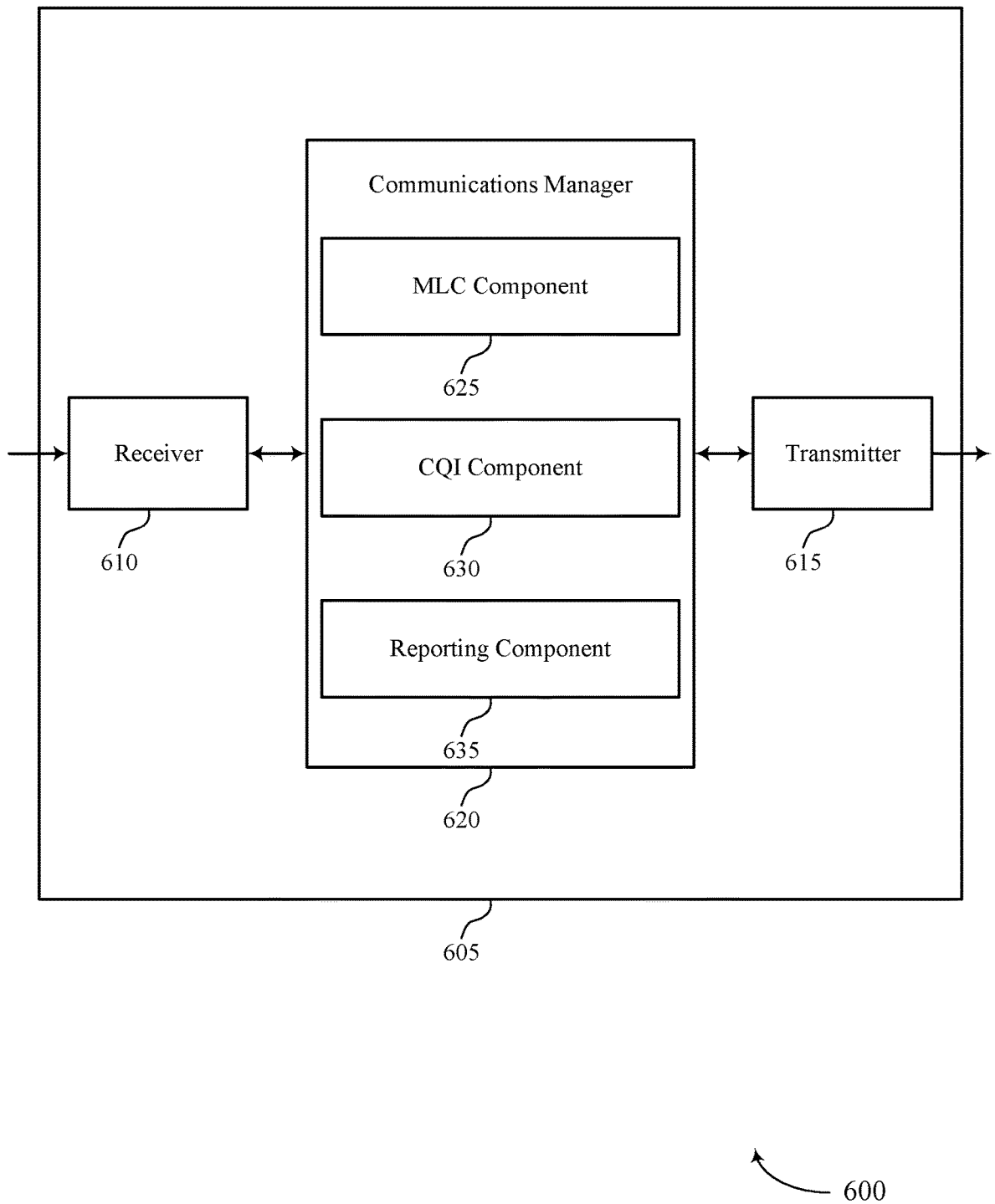

FIG. 6 shows a block diagram 600 of a device 605 that supports channel state feedback extensions for multi-level coding in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel state feedback extensions for multi-level coding). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel state feedback extensions for multi-level coding). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of channel state feedback extensions for multi-level coding as described herein. For example, the communications manager 620 may include an MLC component 625, a CQI component 630, a reporting component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The MLC component 625 may be configured as or otherwise support a means for receiving, from a base station, a message indicating a configuration for the UE to use a multi-level coding procedure to communicate with the base station. The CQI component 630 may be configured as or otherwise support a means for selecting, for a channel quality indicator, a channel quality index from a set of multiple channel quality indices based on the multi-level coding procedure being configured, the set of multiple channel quality indices including a set of channel quality indices associated with the multi-level coding procedure. The reporting component 635 may be configured as or otherwise support a means for transmitting, to the base station, a channel state feedback report including the selected channel quality index.

In some cases, the MLC component 625, the CQI component 630, and the reporting component 635 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the MLC component 625, the CQI component 630, and the reporting component 635 described herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
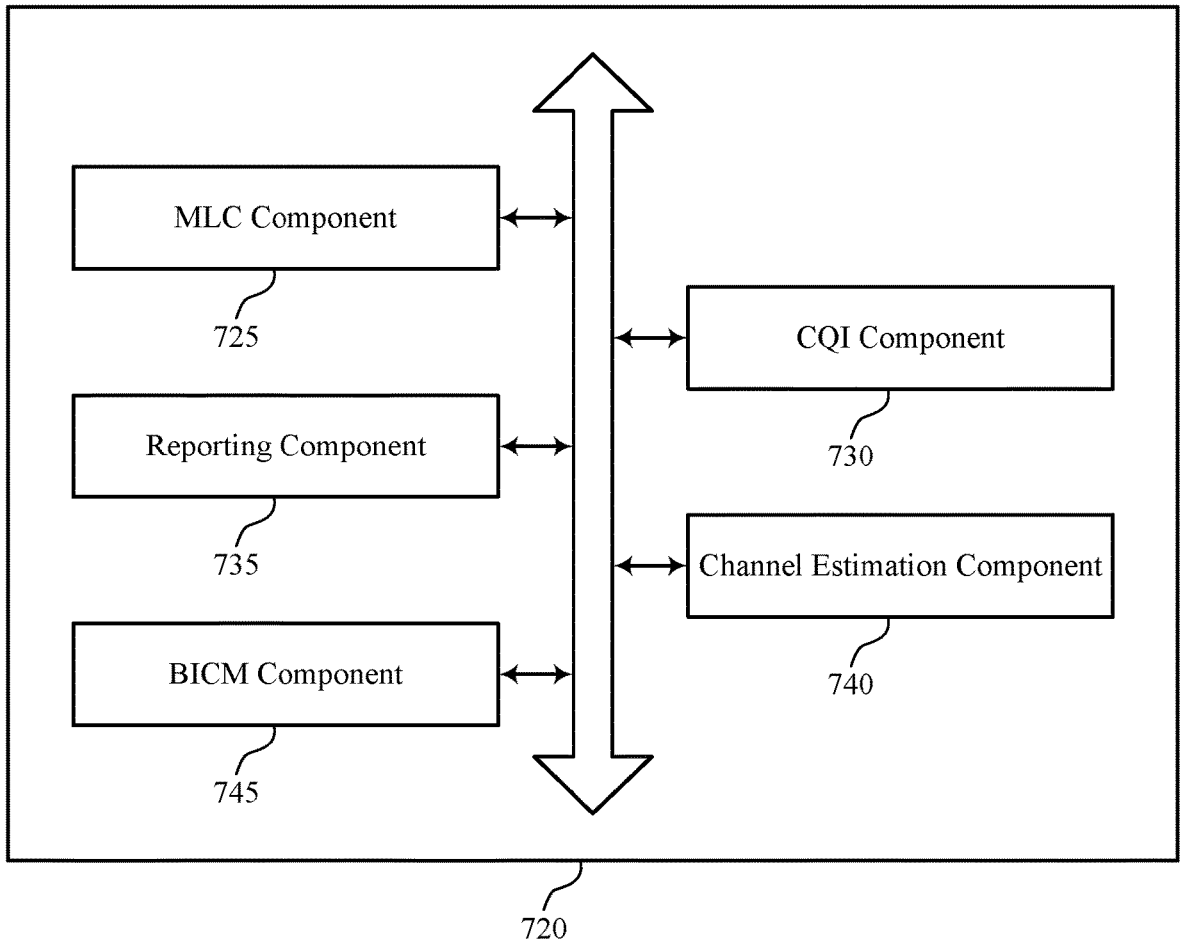
FIG. 7 shows a block diagram of a communications manager that supports channel state feedback extensions for multi-level coding in accordance with aspects of the present disclosure.

FIG. 7 shows a block diagram 700 of a communications manager 720 that supports channel state feedback extensions for multi-level coding in accordance with aspects of the present disclosure. The communications manager 720 may be an example of aspects of a communications manager 520, a communications manager 620, or both, as described herein. The communications manager 720, or various components thereof, may be an example of means for performing various aspects of channel state feedback extensions for multi-level coding as described herein. For example, the communications manager 720 may include an MLC component 725, a CQI component 730, a reporting component 735, a channel estimation component 740, a BICM component 745, or any combination thereof. Each of these components may communicate, directly or indirectly, with one another (e.g., via one or more buses).

The communications manager 720 may support wireless communication at a UE in accordance with examples as disclosed herein. The MLC component 725 may be configured as or otherwise support a means for receiving, from a base station, a message indicating a configuration for the UE to use a multi-level coding procedure to communicate with the base station. The CQI component 730 may be configured as or otherwise support a means for selecting, for a channel quality indicator, a channel quality index from a set of multiple channel quality indices based on the multi-level coding procedure being configured, the set of multiple channel quality indices including a set of channel quality indices associated with the multi-level coding procedure. The reporting component 735 may be configured as or otherwise support a means for transmitting, to the base station, a channel state feedback report including the selected channel quality index.

In some examples, to support selecting the channel quality index, the CQI component 730 may be configured as or otherwise support a means for selecting the set of multiple channel quality indices based on the multi-level coding procedure being configured, where a second set of multiple channel quality indices includes a second set of channel quality indices associated with a bit-interleaved coded modulation procedure.

In some examples, the BICM component 745 may be configured as or otherwise support a means for receiving, from the base station before or after identifying the set of multiple channel quality indices, a second message indicating a second configuration for the UE to use the bit-interleaved coded modulation procedure to communicate with the base station. In some examples, the CQI component 730 may be configured as or otherwise support a means for identifying the second set of multiple channel quality indices based on the second configuration for the UE to use the bit-interleaved coded modulation procedure. In some examples, the CQI component 730 may be configured as or otherwise support a means for selecting, for a second channel quality indicator, a second channel quality index from the second set of multiple channel quality indices based on the UE being configured to use the bit-interleaved coded modulation procedure.

In some examples, the channel estimation component 740 may be configured as or otherwise support a means for determining a signal-to-noise ratio for a channel between the UE and the base station. In some examples, the reporting component 735 may be configured as or otherwise support a means for transmitting an indication of the signal-to-noise ratio to the base station, where the message indicating the configuration for the UE to use the multi-level coding procedure is received at least in part in response to the transmitted indication.

In some examples, the channel estimation component 740 may be configured as or otherwise support a means for determining a signal-to-noise ratio for a channel between the UE and the base station. In some examples, the MLC component 725 may be configured as or otherwise support a means for transmitting a request to use the set of multiple channel quality indices associated with the multi-level coding procedure based on the signal-to-noise ratio exceeding a threshold, where the message indicating a configuration for the UE to use the multi-level coding procedure is received at least in part in response to the request.

In some examples, the MLC component 725 may be configured as or otherwise support a means for transmitting an indication of a multi-level coding capability to the base station, where the message indicating a configuration for the UE to use the multi-level coding procedure is received based on transmitting the indication of the multi-level coding capability.

In some examples, the message indicating a configuration for the UE to use the multi-level coding procedure is a radio resource control message, a downlink control information message, or a medium access control message.

In some examples, to support selecting the channel quality index, the CQI component 730 may be configured as or otherwise support a means for selecting the channel quality index from the set of multiple channel quality indices that further includes a second set of channel quality indices associated with a bit-interleaved coded modulation procedure.

In some examples, the channel estimation component 740 may be configured as or otherwise support a means for determining a spectral efficiency metric and a channel type for a channel between the UE and the base station, where the channel quality index is selected based on the spectral efficiency metric and the channel type.

In some examples, the channel estimation component 740 may be configured as or otherwise support a means for receiving a reference signal from the base station via the channel, where the spectral efficiency metric and the channel type are determined based on the reference signal.

In some examples, the MLC component 725 may be configured as or otherwise support a means for selecting a multi-stage decoding procedure for the channel based on the spectral efficiency metric having a first value and the channel type being of an average Gaussian white noise channel type, where the channel quality index is selected based on the multi-stage decoding procedure being selected for the channel.

In some examples, the MLC component 725 may be configured as or otherwise support a means for selecting, before or after selecting the multi-stage decoding procedure, a parallel independent decoding procedure for the channel based on the spectral efficiency metric having the first value and the channel type being of a fading type. In some examples, the CQI component 730 may be configured as or otherwise support a means for selecting, for a second channel quality indicator, a second channel quality index of the set of multiple channel quality indices based on the parallel independent decoding procedure being selected for the channel.

In some cases, the MLC component 725, the CQI component 730, the reporting component 735, the channel estimation component 740, and the BICM component 745 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the MLC component 725, the CQI component 730, the reporting component 735, the channel estimation component 740, and the BICM component 745 described herein.

Figure 8:
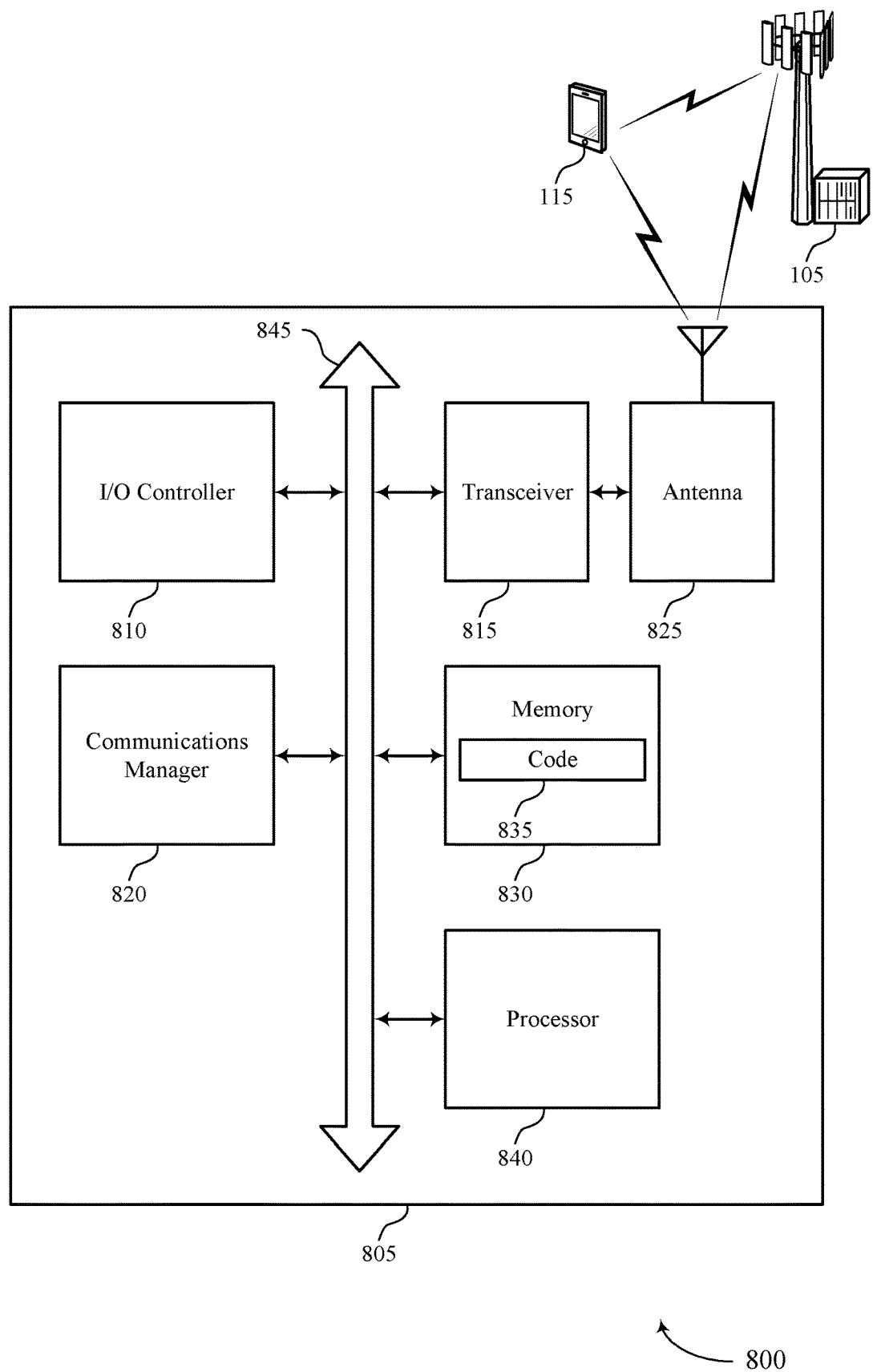
FIG. 8 shows a diagram of a system including a device that supports channel state feedback extensions for multi-level coding in accordance with aspects of the present disclosure.

FIG. 8 shows a diagram of a system 800 including a device 805 that supports channel state feedback extensions for multi-level coding in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting channel state feedback extensions for multi-level coding). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, a message indicating a configuration for the UE to use a multi-level coding procedure to communicate with the base station. The communications manager 820 may be configured as or otherwise support a means for selecting, for a channel quality indicator, a channel quality index from a set of multiple channel quality indices based on the multi-level coding procedure being configured, the set of multiple channel quality indices including a set of channel quality indices associated with the multi-level coding procedure. The communications manager 820 may be configured as or otherwise support a means for transmitting, to the base station, a channel state feedback report including the selected channel quality index.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of channel state feedback extensions for multi-level coding as described herein, or the processor 840 and the memory 830 may be otherwise configured to perform or support such operations.

Figure 9:
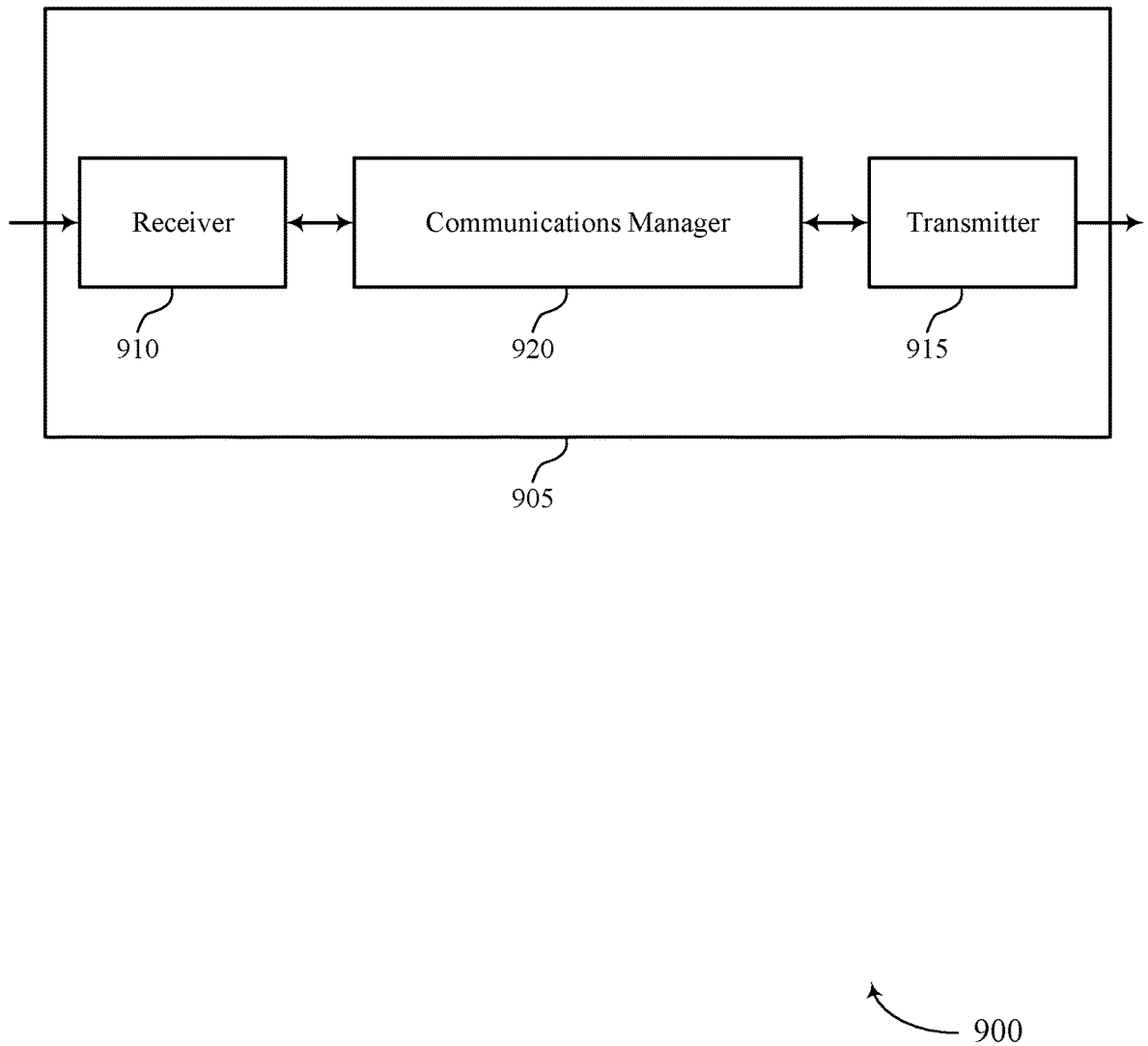
FIGS. 9 and 10 show block diagrams of devices that support channel state feedback extensions for multi-level coding in accordance with aspects of the present disclosure.

FIG. 9 shows a block diagram 900 of a device 905 that supports channel state feedback extensions for multi-level coding in accordance with aspects of the present disclosure. The device 905 may be an example of aspects of a base station 105 as described herein. The device 905 may include a receiver 910, a transmitter 915, and a communications manager 920. The device 905 may also include one or more processors, memory coupled with the one or more processors, and instructions stored in the memory that are executable by the one or more processors to enable the one or more processors to support the multi-level coding features described herein. Each of these components may be in communication with one another (e.g., via one or more buses).

The receiver 910 may provide a means for receiving information such as packets, user data, control information, or any combination thereof associated with various information channels (e.g., control channels, data channels, information channels related to channel state feedback extensions for multi-level coding). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to channel state feedback extensions for multi-level coding). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of channel state feedback extensions for multi-level coding as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, a message indicating a configuration for the UE to use a multi-level coding procedure to communicate with the base station. The communications manager 920 may be configured as or otherwise support a means for receiving, from the UE, a channel state feedback report including a channel quality index based on configuring the multi-level coding procedure. The communications manager 920 may be configured as or otherwise support a means for selecting the multi-level coding procedure for transmitting to the UE based on the channel quality index.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for techniques (such as channel state reporting techniques) for supporting the use of MLC procedures in a radio access network.

Figure 10:
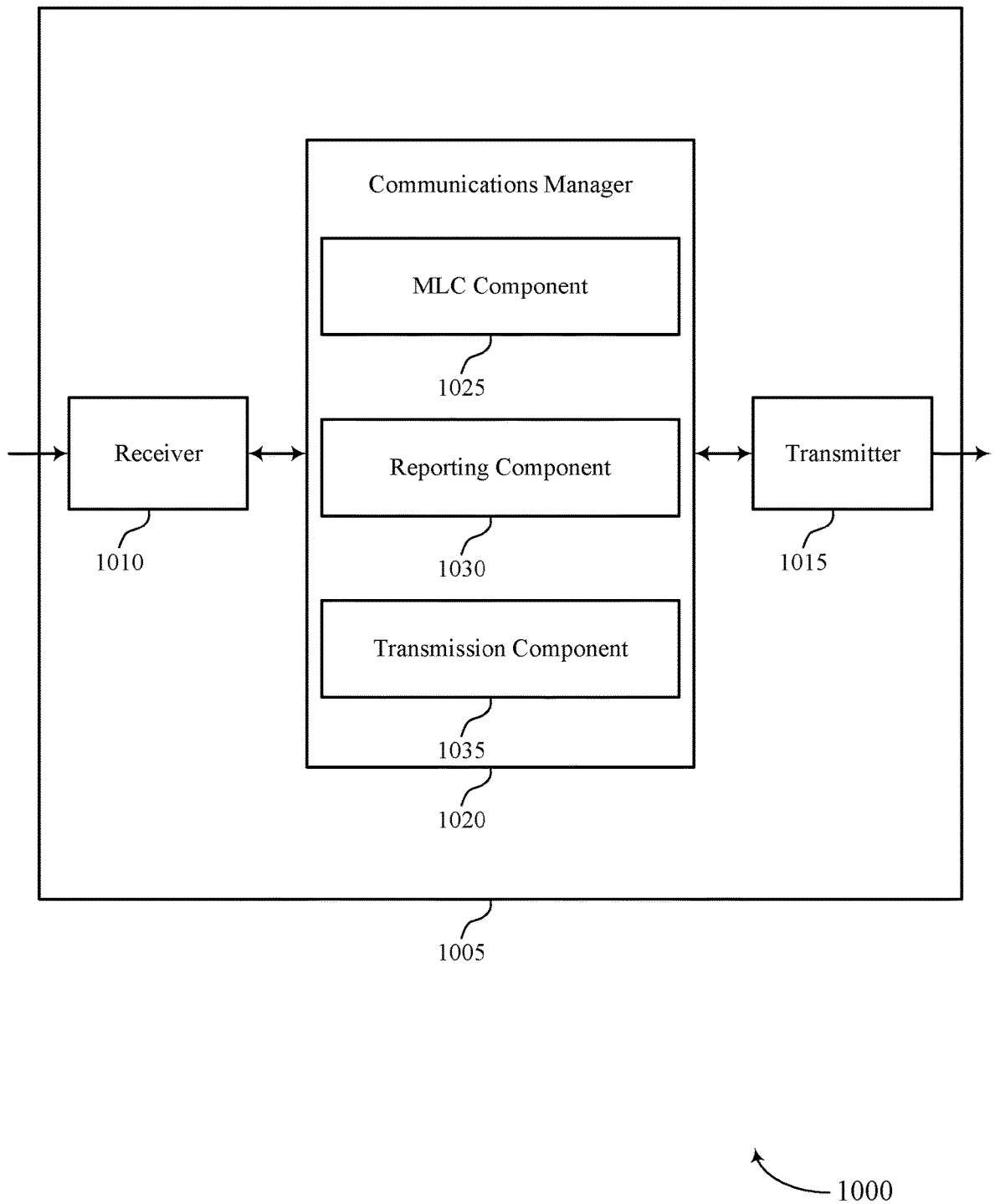

FIG. 10 shows a block diagram 1000 of a device 1005 that supports channel state feedback extensions for multi-level coding in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to channel state feedback extensions for multi-level coding). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to channel state feedback extensions for multi-level coding). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of channel state feedback extensions for multi-level coding as described herein. For example, the communications manager 1020 may include an MLC component 1025, a reporting component 1030, a transmission component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The MLC component 1025 may be configured as or otherwise support a means for transmitting, to a UE, a message indicating a configuration for the UE to use a multi-level coding procedure to communicate with the base station. The reporting component 1030 may be configured as or otherwise support a means for receiving, from the UE, a channel state feedback report including a channel quality index based on configuring the multi-level coding procedure. The transmission component 1035 may be configured as or otherwise support a means for selecting the multi-level coding procedure for transmitting to the UE based on the channel quality index.

In some cases, the MLC component 1025, the reporting component 1030, and the transmission component 1035 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the MLC component 625, the CQI component 630, and the reporting component 635 described herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
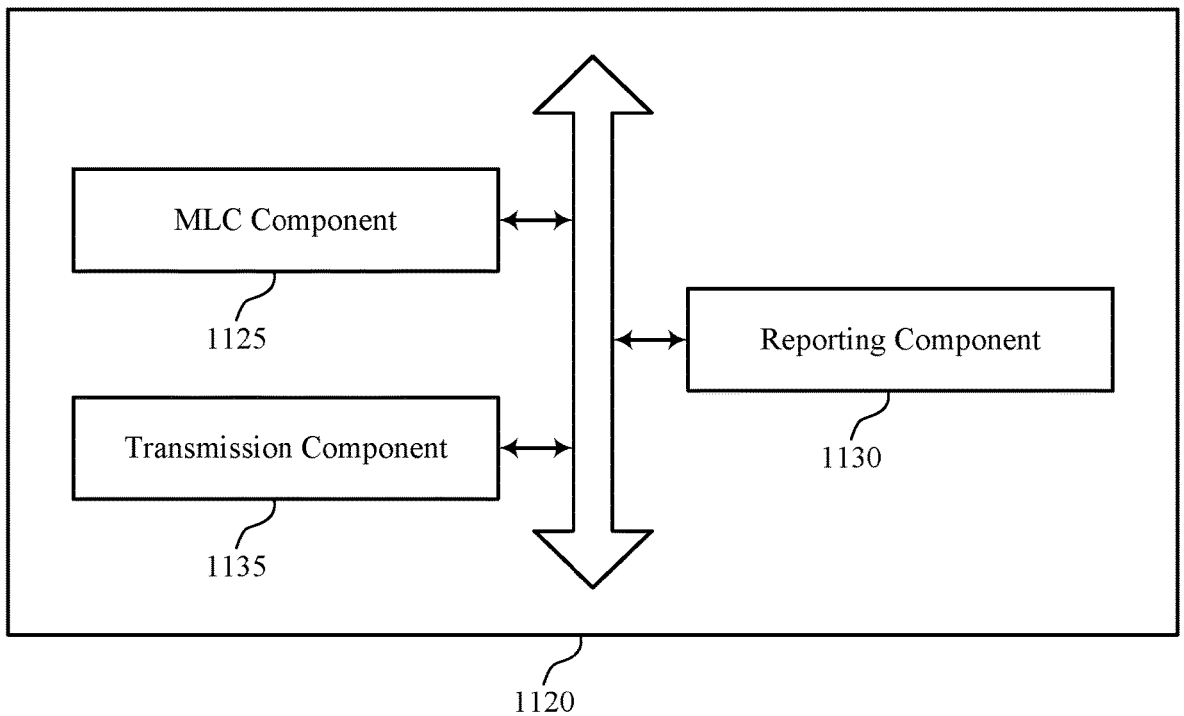
FIG. 11 shows a block diagram of a communications manager that supports channel state feedback extensions for multi-level coding in accordance with aspects of the present disclosure.

FIG. 11 shows a block diagram 1100 of a communications manager 1120 that supports channel state feedback extensions for multi-level coding in accordance with aspects of the present disclosure. The communications manager 1120 may be an example of aspects of a communications manager 920, a communications manager 1020, or both, as described herein. The communications manager 1120, or various components thereof, may be an example of means for performing various aspects of channel state feedback extensions for multi-level coding as described herein. For example, the communications manager 1120 may include an MLC component 1125, a reporting component 1130, a transmission component 1135, or any combination thereof. Each of these components may communicate, directly or indirectly, with one another (e.g., via one or more buses).

The communications manager 1120 may support wireless communication at a base station in accordance with examples as disclosed herein. The MLC component 1125 may be configured as or otherwise support a means for transmitting, to a UE, a message indicating a configuration for the UE to use a multi-level coding procedure to communicate with the base station. The reporting component 1130 may be configured as or otherwise support a means for receiving, from the UE, a channel state feedback report including a channel quality index based on configuring the multi-level coding procedure. The transmission component 1135 may be configured as or otherwise support a means for selecting the multi-level coding procedure for transmitting to the UE based on the channel quality index.

In some examples, the reporting component 1130 may be configured as or otherwise support a means for receiving, from the UE, an indication of a signal-to-noise ratio associated with a channel between the base station and the UE, where the message indicating a configuration for the UE to use the multi-level coding procedure is transmitted to the UE based on the signal-to-noise ratio exceeding a threshold.

In some examples, the message indicating a configuration for the UE to use the multi-level coding procedure includes an indication to use a first set of multiple channel quality indices associated with the multi-level coding procedure. In some examples, a second set of multiple channel quality indices is associated with a bit-interleaved coded modulation procedure.

In some examples, the message indicating a configuration for the UE to use the multi-level coding procedure is a radio resource control message, a downlink control information message, or a medium access control message.

In some cases, the MLC component 1125, the reporting component 1130, and the transmission component 1135 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the MLC component 1125, the reporting component 1130, and the transmission component 1135 described herein.

Figure 12:
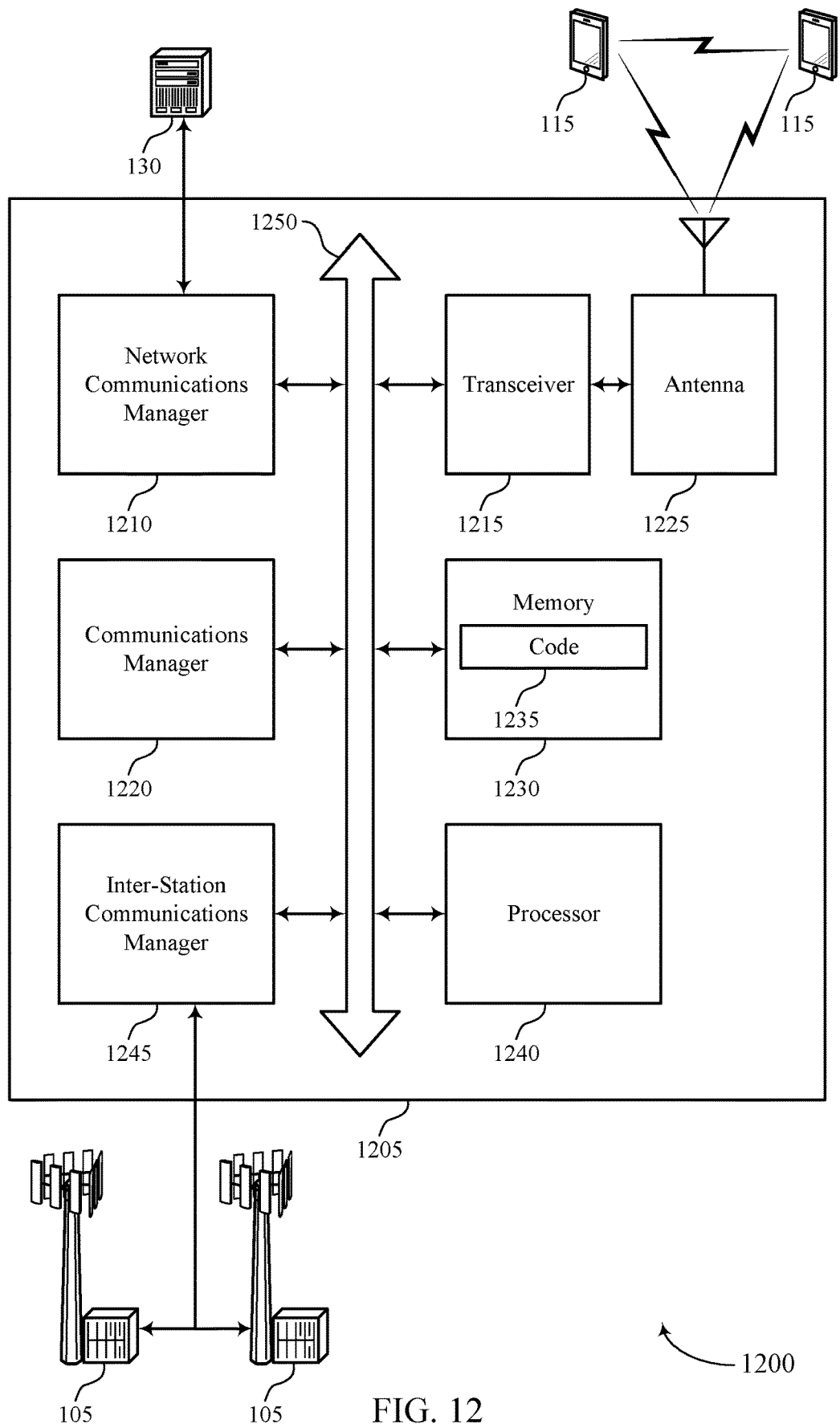
FIG. 12 shows a diagram of a system including a device that supports channel state feedback extensions for multi-level coding in accordance with aspects of the present disclosure.

FIG. 12 shows a diagram of a system 1200 including a device 1205 that supports channel state feedback extensions for multi-level coding in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting channel state feedback extensions for multi-level coding). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, a message indicating a configuration for the UE to use a multi-level coding procedure to communicate with the base station. The communications manager 1220 may be configured as or otherwise support a means for receiving, from the UE, a channel state feedback report including a channel quality index based on configuring the multi-level coding procedure. The communications manager 1220 may be configured as or otherwise support a means for selecting the multi-level coding procedure for transmitting to the UE based on the channel quality index.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of channel state feedback extensions for multi-level coding as described herein, or the processor 1240 and the memory 1230 may be otherwise configured to perform or support such operations.

Figure 13:
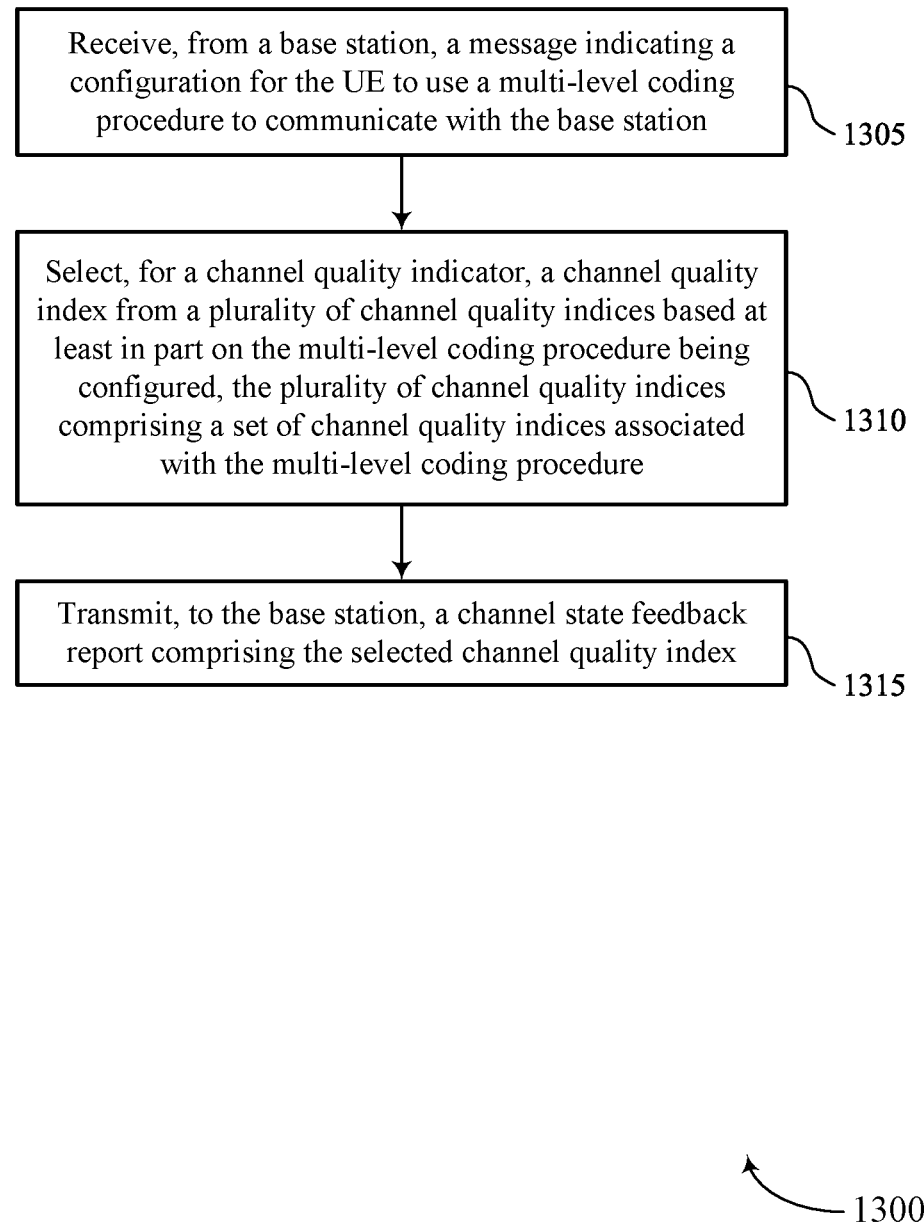
FIGS. 13 and 14 show flowcharts illustrating methods that support channel state feedback extensions for multi-level coding in accordance with aspects of the present disclosure.

FIG. 13 shows a flowchart illustrating a method 1300 that supports channel state feedback extensions for multi-level coding in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a base station, a message indicating a configuration for the UE to use a multi-level coding procedure to communicate with the base station. The operations of 1305 may be performed in accordance with examples as disclosed herein. In some examples, aspects of the operations of 1305 may be performed by an MLC component 725 as described with reference to FIG. 7.

At 1310, the method may include selecting, for a channel quality indicator, a channel quality index from a set of multiple channel quality indices based on the multi-level coding procedure being configured, the set of multiple channel quality indices including a set of channel quality indices associated with the multi-level coding procedure. The operations of 1310 may be performed in accordance with examples as disclosed herein. In some examples, aspects of the operations of 1310 may be performed by a CQI component 730 as described with reference to FIG. 7.

At 1315, the method may include transmitting, to the base station, a channel state feedback report including the selected channel quality index. The operations of 1315 may be performed in accordance with examples as disclosed herein. In some examples, aspects of the operations of 1315 may be performed by a reporting component 735 as described with reference to FIG. 7.

Figure 14:
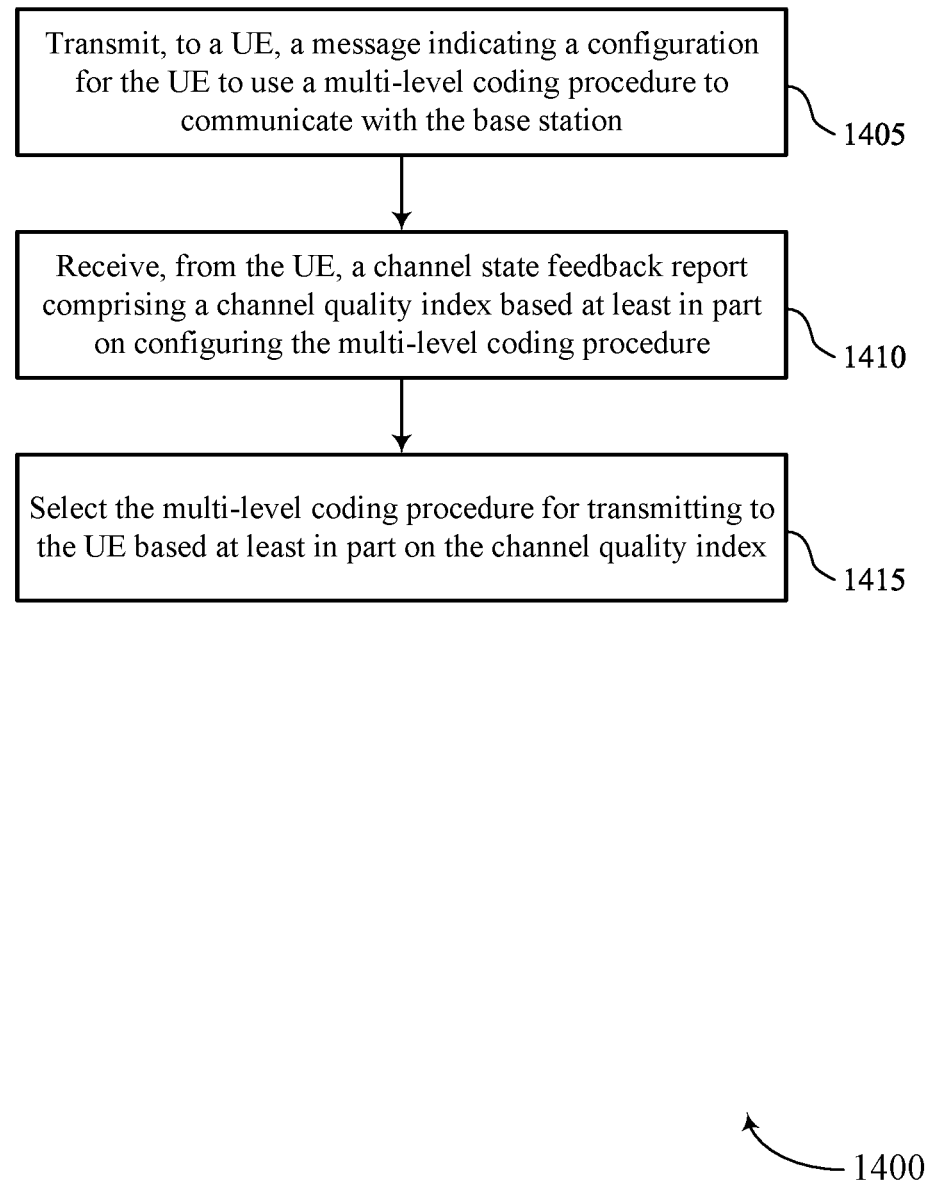

FIG. 14 shows a flowchart illustrating a method 1400 that supports channel state feedback extensions for multi-level coding in accordance with aspects of the present disclosure. The operations of the method 1400 may be implemented by a base station or its components as described herein. For example, the operations of the method 1400 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1405, the method may include transmitting, to a UE, a message indicating a configuration for the UE to use a multi-level coding procedure to communicate with the base station. The operations of 1405 may be performed in accordance with examples as disclosed herein. In some examples, aspects of the operations of 1405 may be performed by an MLC component 1125 as described with reference to FIG. 11.

At 1410, the method may include receiving, from the UE, a channel state feedback report including a channel quality index based on configuring the multi-level coding procedure. The operations of 1410 may be performed in accordance with examples as disclosed herein. In some examples, aspects of the operations of 1410 may be performed by a reporting component 1130 as described with reference to FIG. 11.

At 1415, the method may include selecting the multi-level coding procedure for transmitting to the UE based on the channel quality index. The operations of 1415 may be performed in accordance with examples as disclosed herein. In some examples, aspects of the operations of 1415 may be performed by a transmission component 1135 as described with reference to FIG. 11.

The following provides an overview of aspects of the present disclosure:

Aspect 1: A method for wireless communication at a UE, comprising: receiving, from a base station, a message indicating a configuration for the UE to use a multi-level coding procedure to communicate with the base station; selecting, for a channel quality indicator, a channel quality index from a plurality of channel quality indices based at least in part on the multi-level coding procedure being configured, the plurality of channel quality indices comprising a set of channel quality indices associated with the multi-level coding procedure; and transmitting, to the base station, a channel state feedback report comprising the selected channel quality index.

Aspect 2: The method of aspect 1, wherein selecting the channel quality index comprises: selecting the plurality of channel quality indices based at least in part on the multi-level coding procedure being configured, wherein a second plurality of channel quality indices comprises a second set of channel quality indices associated with a bit-interleaved coded modulation procedure.

Aspect 3: The method of aspect 2, further comprising: receiving, from the base station before or after identifying the plurality of channel quality indices, a second message indicating a second configuration for the UE to use the bit-interleaved coded modulation procedure to communicate with the base station; identifying the second plurality of channel quality indices based at least in part on the second configuration for the UE to use the bit-interleaved coded modulation procedure; and selecting, for a second channel quality indicator, a second channel quality index from the second plurality of channel quality indices based at least in part on the UE being configured to use the bit-interleaved coded modulation procedure.

Aspect 4: The method of any of aspects 1 through 3, further comprising: determining a signal-to-noise ratio for a channel between the UE and the base station; and transmitting an indication of the signal-to-noise ratio to the base station, wherein the message indicating the configuration for the UE to use the multi-level coding procedure is received at least in part in response to the transmitted indication.

Aspect 5: The method of any of aspects 1 through 4, further comprising: determining a signal-to-noise ratio for a channel between the UE and the base station; and transmitting a request to use the plurality of channel quality indices associated with the multi-level coding procedure based at least in part on the signal-to-noise ratio exceeding a threshold, wherein the message indicating a configuration for the UE to use the multi-level coding procedure is received at least in part in response to the request.

Aspect 6: The method of any of aspects 1 through 5, further comprising: transmitting an indication of a multi-level coding capability to the base station, wherein the message indicating a configuration for the UE to use the multi-level coding procedure is received based at least in part on transmitting the indication of the multi-level coding capability.

Aspect 7: The method of any of aspects 1 through 6, wherein the message indicating a configuration for the UE to use the multi-level coding procedure is a radio resource control message, a downlink control information message, or a medium access control message.

Aspect 8: The method of any of aspects 1 through 7, wherein selecting the channel quality index comprises: selecting the channel quality index from the plurality of channel quality indices that further comprises a second set of channel quality indices associated with a bit-interleaved coded modulation procedure.

Aspect 9: The method of any of aspects 1 through 8, further comprising: determining a spectral efficiency metric and a channel type for a channel between the UE and the base station, wherein the channel quality index is selected based at least in part on the spectral efficiency metric and the channel type.

Aspect 10: The method of aspect 9, further comprising: receiving a reference signal from the base station via the channel, wherein the spectral efficiency metric and the channel type are determined based at least in part on the reference signal.

Aspect 11: The method of any of aspects 9 through 10, further comprising: selecting a multi-stage decoding procedure for the channel based at least in part on the spectral efficiency metric having a first value and the channel type being of an average Gaussian white noise channel type, wherein the channel quality index is selected based at least in part on the multi-stage decoding procedure being selected for the channel.

Aspect 12: The method of aspect 11, further comprising: selecting, before or after selecting the multi-stage decoding procedure, a parallel independent decoding procedure for the channel based at least in part on the spectral efficiency metric having the first value and the channel type being of a fading type; and selecting, for a second channel quality indicator, a second channel quality index of the plurality of channel quality indices based at least in part on the parallel independent decoding procedure being selected for the channel.

Aspect 13: A method for wireless communication at a base station, comprising: transmitting, to a UE, a message indicating a configuration for the UE to use a multi-level coding procedure to communicate with the base station; receiving, from the UE, a channel state feedback report comprising a channel quality index based at least in part on configuring the multi-level coding procedure; and selecting the multi-level coding procedure for transmitting to the UE based at least in part on the channel quality index.

Aspect 14: The method of aspect 13, further comprising: receiving, from the UE, an indication of a signal-to-noise ratio associated with a channel between the base station and the UE, wherein the message indicating a configuration for the UE to use the multi-level coding procedure is transmitted to the UE based at least in part on the signal-to-noise ratio exceeding a threshold.

Aspect 15: The method of any of aspects 13 through 14, wherein the message indicating a configuration for the UE to use the multi-level coding procedure comprises an indication to use a first plurality of channel quality indices associated with the multi-level coding procedure, and a second plurality of channel quality indices is associated with a bit-interleaved coded modulation procedure.

Aspect 16: The method of any of aspects 13 through 15, wherein the message indicating a configuration for the UE to use the multi-level coding procedure is a radio resource control message, a downlink control information message, or a medium access control message.

Aspect 17: An apparatus for wireless communication at a UE, comprising a processor; memory coupled with the processor; and instructions stored in the memory and executable by the processor to cause the apparatus to perform a method of any of aspects 1 through 12.

Aspect 18: An apparatus for wireless communication at a UE, comprising at least one means for performing a method of any of aspects 1 through 12.

Aspect 19: A non-transitory computer-readable medium storing code for wireless communication at a UE, the code comprising instructions executable by a processor to perform a method of any of aspects 1 through 12.

Aspect 20: An apparatus for wireless communication at a base station, comprising a processor; memory coupled with the processor; and instructions stored in the memory and executable by the processor to cause the apparatus to perform a method of any of aspects 13 through 16.

Aspect 21: An apparatus for wireless communication at a base station, comprising at least one means for performing a method of any of aspects 13 through 16.

Aspect 22: A non-transitory computer-readable medium storing code for wireless communication at a base station, the code comprising instructions executable by a processor to perform a method of any of aspects 13 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, a message indicating a configuration for the UE to activate a multi-level coding procedure to communicate with the base station;
   selecting a first plurality of channel quality indices based at least in part on the multi-level coding procedure being activated;
   selecting, for a channel quality indicator, a channel quality index from the first plurality of channel quality indices based at least in part on the multi-level coding procedure being configured, the first plurality of channel quality indices comprising a first set of channel quality indices associated with the multi-level coding procedure, wherein a second plurality of channel quality indices comprises a second set of channel quality indices associated with a bit-interleaved coded modulation procedure; and
   transmitting, to the base station, a channel state feedback report comprising the selected channel quality index.

2. The method of claim 1, further comprising:
   receiving, from the base station before or after identifying the first plurality of channel quality indices, a second message indicating a second configuration for the UE to use the bit-interleaved coded modulation procedure to communicate with the base station;
   identifying the second plurality of channel quality indices based at least in part on the second configuration for the UE to use the bit-interleaved coded modulation procedure; and
   selecting, for a second channel quality indicator, a second channel quality index from the second plurality of channel quality indices based at least in part on the UE being configured to use the bit-interleaved coded modulation procedure.

3. The method of claim 1, further comprising:
   determining a signal-to-noise ratio for a channel between the UE and the base station; and
   transmitting an indication of the signal-to-noise ratio to the base station, wherein the message indicating the configuration for the UE to activate the multi-level coding procedure is received at least in part in response to the transmitted indication.

4. The method of claim 1, further comprising:
   determining a signal-to-noise ratio for a channel between the UE and the base station; and
   transmitting a request to use the first plurality of channel quality indices associated with the multi-level coding procedure based at least in part on the signal-to-noise ratio exceeding a threshold, wherein the message indicating the configuration for the UE to activate the multi-level coding procedure is received at least in part in response to the request.

5. The method of claim 1, further comprising:
   transmitting an indication of a multi-level coding capability to the base station, wherein the message indicating the configuration for the UE to activate the multi-level coding procedure is received based at least in part on transmitting the indication of the multi-level coding capability.

6. The method of claim 1, wherein the message indicating the configuration for the UE to activate the multi-level coding procedure is a radio resource control message, a downlink control information message, or a medium access control message.

7. The method of claim 1, wherein selecting the channel quality index comprises:
selecting the channel quality index from the first plurality of channel quality indices that further comprises the second set of channel quality indices associated with the bit-interleaved coded modulation procedure.

8. The method of claim 1, further comprising:
determining a spectral efficiency metric and a channel type for a channel between the UE and the base station, wherein the channel quality index is selected based at least in part on the spectral efficiency metric and the channel type.

9. The method of claim 8, further comprising:
receiving a reference signal from the base station via the channel, wherein the spectral efficiency metric and the channel type are determined based at least in part on the reference signal.

10. The method of claim 8, further comprising:
selecting a multi-stage decoding procedure for the channel based at least in part on the spectral efficiency metric having a first value and the channel type being of an average Gaussian white noise channel type, wherein the channel quality index is selected based at least in part on the multi-stage decoding procedure being selected for the channel.

11. The method of claim 10, further comprising:
selecting, before or after selecting the multi-stage decoding procedure, a parallel independent decoding procedure for the channel based at least in part on the spectral efficiency metric having the first value and the channel type being of a fading type; and
selecting, for a second channel quality indicator, a second channel quality index of the first plurality of channel quality indices based at least in part on the parallel independent decoding procedure being selected for the channel.

12. A method for wireless communication at a base station, comprising:
transmitting, to a user equipment (UE), a message indicating a configuration for the UE to activate a multi-level coding procedure to communicate with the base station, wherein the message indicating the configuration for the UE to activate the multi-level coding procedure comprises an indication to use a first plurality of channel quality indices associated with the multi-level coding procedure, and wherein a second plurality of channel quality indices is associated with a bit-interleaved coded modulation procedure;
receiving, from the UE, a channel state feedback report comprising a channel quality index based at least in part on configuring the multi-level coding procedure; and
selecting the multi-level coding procedure for transmitting to the UE based at least in part on the channel quality index.

13. The method of claim 12, further comprising:
receiving, from the UE, an indication of a signal-to-noise ratio associated with a channel between the base station and the UE, wherein the message indicating the configuration for the UE to activate the multi-level coding procedure is transmitted to the UE based at least in part on the signal-to-noise ratio exceeding a threshold.

14. The method of claim 12, wherein the message indicating the configuration for the UE to activate the multi-level coding procedure is a radio resource control message, a downlink control information message, or a medium access control message.

15. An apparatus for wireless communication at a user equipment (UE), comprising:
a processor;
memory coupled with the processor; and
instructions stored in the memory and executable by the processor to cause the apparatus to:
receive, from a base station, a message indicating a configuration for the UE to activate a multi-level coding procedure to communicate with the base station;
select a first plurality of channel quality indices based at least in part on the multi-level coding procedure being activated;
select, for a channel quality indicator, a channel quality index from the first plurality of channel quality indices based at least in part on the multi-level coding procedure being configured, the first plurality of channel quality indices comprising a set of channel quality indices associated with the multi-level coding procedure, wherein a second plurality of channel quality indices comprises a second set of channel quality indices associated with a bit-interleaved coded modulation procedure; and
transmit, to the base station, a channel state feedback report comprising the selected channel quality index.

16. The apparatus of claim 15, wherein the instructions are further executable by the processor to cause the apparatus to:
receive, from the base station before or after identifying the first plurality of channel quality indices, a second message indicating a second configuration for the UE to use the bit-interleaved coded modulation procedure to communicate with the base station;
identify the second plurality of channel quality indices based at least in part on the second configuration for the UE to use the bit-interleaved coded modulation procedure; and
select, for a second channel quality indicator, a second channel quality index from the second plurality of channel quality indices based at least in part on the UE being configured to use the bit-interleaved coded modulation procedure.

17. The apparatus of claim 15, wherein the instructions are further executable by the processor to cause the apparatus to:
determine a signal-to-noise ratio for a channel between the UE and the base station; and
transmit an indication of the signal-to-noise ratio to the base station, wherein the message indicating the configuration for the UE to activate the multi-level coding procedure is received at least in part in response to the transmitted indication.

18. The apparatus of claim 15, wherein the instructions are further executable by the processor to cause the apparatus to:
determine a signal-to-noise ratio for a channel between the UE and the base station; and
transmit a request to use the first plurality of channel quality indices associated with the multi-level coding procedure based at least in part on the signal-to-noise ratio exceeding a threshold, wherein the message indicating the configuration for the UE to activate the multi-level coding procedure is received at least in part in response to the request.

19. The apparatus of claim 15, wherein the instructions are further executable by the processor to cause the apparatus to:
  transmit an indication of a multi-level coding capability to the base station, wherein the message indicating the configuration for the UE to activate the multi-level coding procedure is received based at least in part on transmitting the indication of the multi-level coding capability.

20. The apparatus of claim 15, wherein the message indicating the configuration for the UE to activate the multi-level coding procedure is a radio resource control message, a downlink control information message, or a medium access control message.

21. The apparatus of claim 15, wherein the instructions to select the channel quality index are executable by the processor to cause the apparatus to:
  select the channel quality index from the first plurality of channel quality indices that further comprises the second set of channel quality indices associated with the bit-interleaved coded modulation procedure.

22. The apparatus of claim 15, wherein the instructions are further executable by the processor to cause the apparatus to:
  determine a spectral efficiency metric and a channel type for a channel between the UE and the base station, wherein the channel quality index is selected based at least in part on the spectral efficiency metric and the channel type.

23. The apparatus of claim 22, wherein the instructions are further executable by the processor to cause the apparatus to:
  receive a reference signal from the base station via the channel, wherein the spectral efficiency metric and the channel type are determined based at least in part on the reference signal.

24. An apparatus for wireless communication at a base station, comprising:
  a processor;
  memory coupled with the processor; and
  instructions stored in the memory and executable by the processor to cause the apparatus to:
    transmit, to a user equipment (UE), a message indicating a configuration for the UE to activate a multi-level coding procedure to communicate with the base station, wherein the message indicating the configuration for the UE to use the multi-level coding procedure comprises an indication to activate a first plurality of channel quality indices associated with the multi-level coding procedure, and a second plurality of channel quality indices is associated with a bit-interleaved coded modulation procedure;
    receive, from the UE, a channel state feedback report comprising a channel quality index based at least in part on configuring the multi-level coding procedure; and
    select the multi-level coding procedure for transmitting to the UE based at least in part on the channel quality index.

25. The apparatus of claim 24, wherein the instructions are further executable by the processor to cause the apparatus to:
  receive, from the UE, an indication of a signal-to-noise ratio associated with a channel between the base station and the UE, wherein the message indicating the configuration for the UE to activate the multi-level coding procedure is transmitted to the UE based at least in part on the signal-to-noise ratio exceeding a threshold.

26. The apparatus of claim 24, wherein the message indicating the configuration for the UE to activate the multi-level coding procedure is a radio resource control message, a downlink control information message, or a medium access control message.

* * * * *